(12) United States Patent
Tatsuwaki et al.

(10) Patent No.: US 12,151,742 B2
(45) Date of Patent: Nov. 26, 2024

(54) VEHICLE EQUIPPED WITH BATTERY PACK

(71) Applicant: Honda Motor Co., Ltd., Tokyo (JP)

(72) Inventors: Masaaki Tatsuwaki, Saitama (JP); Ken Yasui, Saitama (JP); Satoru Kawabe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 462 days.

(21) Appl. No.: 17/510,351

(22) Filed: Oct. 25, 2021

(65) Prior Publication Data

US 2022/0161855 A1 May 26, 2022

(30) Foreign Application Priority Data

Nov. 25, 2020 (JP) ................. 2020-195242

(51) Int. Cl.
*B62D 21/15* (2006.01)
*B60K 1/04* (2019.01)
(Continued)

(52) U.S. Cl.
CPC ................ *B62D 21/15* (2013.01); *B60K 1/04* (2013.01); *B62D 25/20* (2013.01); *B60K 2001/0438* (2013.01); *B60R 16/03* (2013.01)

(58) Field of Classification Search
CPC .... B62D 21/15; B62D 25/20; B62D 25/2036; B62D 25/2009; B62D 25/2063; B60K 1/04; B60K 2001/0438; B60K 2001/0422; B60K 2001/0433; B60R 16/03; B60Y 2306/01; B60L 50/66; H01M 50/202;
(Continued)

(56) References Cited

U.S. PATENT DOCUMENTS 7,469,957 B1 * 12/2008 Boettcher .......... B62D 25/2018
296/193.07
7,699,385 B2    4/2010 Kurata
(Continued)

FOREIGN PATENT DOCUMENTS

CN          101117135         2/2008
CN          101332837         12/2008
(Continued)

OTHER PUBLICATIONS

Nitta et al., WO 2018212161 A1, machine translation (Year: 2018).*
(Continued)

*Primary Examiner* — Jason S Morrow
*Assistant Examiner* — Wenwei Zhuo
(74) *Attorney, Agent, or Firm* — JCIPRNET

(57) ABSTRACT

Provide is a vehicle equipped with a battery pack. In the vehicle equipped with a battery pack, right and left second floor cross members support a rear portion of a front seat, and right and left third floor cross members support a front portion of a rear seat. First to fourth floor longitudinal frames extend in a front-rear direction of the vehicle body between the right and left second floor cross members and the right and left third floor cross members, and are raised upward from a floor panel. The battery pack is arranged below the floor panel and is fixed to the first to fourth floor longitudinal frames.

18 Claims, 10 Drawing Sheets

(51) Int. Cl.
*B62D 25/20* (2006.01)
*B60R 16/03* (2006.01)

(58) Field of Classification Search
CPC ............. H01M 50/242; H01M 50/262; H01M 50/249; H01M 50/204
USPC ............... 296/187.08, 193.07, 204; 180/68.5
See application file for complete search history.

(56) References Cited

U.S. PATENT DOCUMENTS

| | | | |
|---|---|---|---|
| 9,259,998 B1 * | 2/2016 | Leanza ................... | B62D 25/20 |
| 10,220,694 B2 | 3/2019 | Mizoguchi et al. | |
| 10,688,857 B2 | 6/2020 | Tsuyuzaki et al. | |
| 10,766,347 B2 | 9/2020 | Iwasa et al. | |
| 10,967,722 B2 * | 4/2021 | Tanaka ................... | B60L 50/64 |
| 11,239,508 B2 | 2/2022 | Asakura et al. | |
| 2010/0264699 A1 | 10/2010 | Wang et al. | |
| 2013/0068548 A1 * | 3/2013 | Akazawa ................. | B60K 1/04 180/68.5 |
| 2013/0229030 A1 | 9/2013 | Yamaguchi et al. | |
| 2018/0304937 A1 * | 10/2018 | Kita ................... | B62D 25/2045 |
| 2019/0210659 A1 * | 7/2019 | Choi ....................... | B60K 1/04 |
| 2019/0275874 A1 | 9/2019 | Fukui | |
| 2021/0339617 A1 * | 11/2021 | Ohkuma ............. | H01M 50/242 |
| 2024/0123811 A1 * | 4/2024 | Yi ....................... | H01M 10/613 |

FOREIGN PATENT DOCUMENTS

| | | | | |
|---|---|---|---|---|
| CN | 102317097 | | 1/2012 | |
| CN | C102317097 | | 1/2012 | |
| CN | 105291800 | | 2/2016 | |
| CN | 109334782 A | * | 2/2019 | .............. B60K 1/04 |
| CN | 110588801 | | 12/2019 | |
| CN | 209904513 | | 1/2020 | |
| CN | 111017041 A | * | 4/2020 | ......... B62D 25/2009 |
| CN | 211543704 | | 9/2020 | |
| DE | 102012203882 | | 9/2013 | |
| FR | 2684347 | | 6/1993 | |
| JP | 2011006052 | | 1/2011 | |
| JP | 2012176751 | | 9/2012 | |
| JP | 2014012524 | | 1/2014 | |
| JP | 2018193003 | | 12/2018 | |
| JP | 2018203029 | | 12/2018 | |
| JP | 2019179595 | | 10/2019 | |
| JP | 2020111101 | | 7/2020 | |
| JP | 2020131728 | | 8/2020 | |
| WO | WO-2018212161 A1 | * | 11/2018 | ............. B62D 25/20 |

OTHER PUBLICATIONS

"Office Action of Japan Counterpart Application", issued on Jul. 25, 2023, with English translation thereof, p. 1-p. 6.
"Office Action of China Counterpart Application", issued on Mar. 5, 2024, with English translation thereof, p. 1-p. 15.

* cited by examiner

VEHICLE EQUIPPED WITH BATTERY PACK

CROSS-REFERENCE TO RELATED APPLICATION

This application claims the priority benefit of Japan application serial no. 2020-195242, filed on Nov. 25, 2020. The entirety of the above-mentioned patent application is hereby incorporated by reference herein and made a part of this specification.

BACKGROUND

Technical Field

The disclosure relates to a vehicle equipped with a battery pack.

Related Art

As a vehicle equipped with a battery pack, for example, a configuration has been disclosed in which a floor cross member supporting a seat is divided into three parts, a fastening bracket is arranged at a joint portion of the three-divided floor cross member, and a battery cross member of a battery pack is supported by the fastening bracket. The battery pack is arranged below a floor panel (that is, below a floor) with the battery cross member supported by the floor cross member via the fastening bracket (for example, see Patent literature 1: Japanese Patent Application Laid-Open No. 2018-193003).

By supporting the battery cross member with the floor cross member, the battery pack can be firmly supported by the floor cross member. In addition, by dividing the floor cross member into three parts, press molding of the three-divided floor cross member can be easily performed. Furthermore, the fastening bracket is arranged at the joint portion of the three-divided floor cross member. Thus, for example, it is possible to promote the dispersion of an impact load input by a side collision (hereinafter, may also be referred to as side collision load).

However, according to the vehicle equipped with a battery pack described in Patent literature 1, for example, when the battery cross member is to be aligned with the floor cross member in a front-rear direction of a vehicle body, it is necessary to arrange the battery pack according to a position of the seat. Therefore, because the battery pack is arranged based on the position of the seat, the degree of freedom in arranging (laying out) component parts such as batteries of the battery pack and the like (particularly, the degree of freedom in arranging the batteries with a longitudinal direction of a vertically elongated battery set as the front-rear direction of the vehicle body) is limited.

As a measure for this, for example, when an arrangement position of the battery pack with respect to the vehicle body is prioritized, a position of the floor cross member of the vehicle body is designed exclusively for an electric vehicle instead of a normal gasoline vehicle, and the platform cannot be shared. On the other hand, if the battery cross member of the battery pack is matched with the floor cross member of the vehicle body, the type, size, and capacity of the battery are limited.

In addition, in the battery pack, for example, a fastening portion at which the battery cross member is fastened to the fastening bracket is located at a central portion in the front-rear direction of the vehicle body. Thus, it is necessary to fasten the central fastening portion from below in the front-rear direction of the vehicle body. Therefore, it is conceivable that a distance for an access to the fastening portion of the battery cross member becomes long, which affects workability.

As a measure for this, for example, it is conceivable to configure in a manner that the fastening portion of the battery pack can be fastened from an upper portion of the vehicle (that is, above the floor panel). However, for example, it is conceivable that the fastening portion of the battery pack is located below the seat. Therefore, when the battery pack is attached or detached, it is necessary to slide (move) the seat in the front-rear direction of the vehicle body or remove the seat from the vehicle body, which increases a maintenance cost due to the increase in work processes.

SUMMARY

The disclosure proposes the following solutions.

(1) A vehicle equipped with a battery pack according to the disclosure includes: a second floor cross member (for example, a right second floor cross member 45 and a left second floor cross member 45 in an embodiment) that is raised upward from a floor panel (for example, a floor panel 23 in an embodiment) forming a floor portion of the vehicle (for example, a vehicle Ve equipped with a battery pack in an embodiment) and extends in a vehicle width direction to support a rear portion of a front seat (for example, a right front seat FS1 and a left front seat FS2 in the embodiment); a third floor cross member (for example, a right third floor cross member 46 and a left third floor cross member 46 in the embodiment) that extends in the vehicle width direction along the second floor cross member at the vehicle body rear of the second floor cross member and is raised upward from the floor panel to support a front portion of a rear seat (for example, a rear seat RS in the embodiment); a floor longitudinal frame (for example, first to fourth floor longitudinal frames 55 to 58 in the embodiment) that extends in a front-rear direction of the vehicle body between the second floor cross member and the third floor cross member; and a battery pack (for example, a battery pack 20 in the embodiment) which is arranged under a floor of the floor longitudinal frame and the floor panel, and in which a battery case (for example, a battery case 81 in the embodiment) for accommodating a battery module (for example, a battery module 82 in the embodiment) is vertically fixed to the floor longitudinal frame.

According to this configuration, the third floor cross member is arranged at the vehicle body rear of the second floor cross member. In addition, the floor longitudinal frame is arranged between the second floor cross member and the third floor cross member, and the floor longitudinal frame is extended in the front-rear direction of the vehicle body. Furthermore, the second floor cross member supports the rear portion (rear leg) of the front seat, and the third floor cross member supports the front portion (front leg) of the rear seat. In addition, the battery case of the battery pack is fixed vertically to the floor longitudinal frame. Thereby, the degree of freedom in arranging (laying out) component parts such as the battery of the battery pack and the like can be improved in the front-rear direction of the vehicle body.

Particularly, by improving the degree of freedom in arranging component parts such as the battery of the battery pack and the like in the front-rear direction of the vehicle body, for example, a maximum amplitude position of vertical vibration generated in the battery case when a vehicle is running can be fixed to the vehicle body.

In addition, for example, a fastening bolt and the like for fastening (fixing) the battery case of the battery pack to the floor longitudinal frame can be arranged in a space on the indoor side between the front seat and the rear seat. Thereby, an access of a tool to the fastening bolt for fastening the battery pack to the vehicle body can be facilitated.

Furthermore, by arranging the fastening bolt and the like for fastening the battery pack in the space between the front seat and the rear seat, when the battery pack is attached or detached, for example, there is no need to slid (move) the front seat in the front-rear direction of the vehicle body or remove the front seat and the rear seat.

Thereby, restrictions on the assembly order can be reduced, the work time can be shortened due to reduction in the work processes, and the maintenance (maintenance and inspection) cost can be kept low.

(2) The vehicle equipped with a battery pack according to the disclosure may include: a first floor cross member (for example, a first floor cross member 44 in the embodiment) that extends in the vehicle width direction along the second floor cross member in the vehicle body front of the second floor cross member and supports a front portion of the front seat; a fourth floor cross member (for example, a fourth floor cross member 47 in the embodiment) that extends in the vehicle width direction along the third floor cross member at the vehicle body rear of the third floor cross member; a side sill (for example, a right side sill 31 and a left side sill 31 in the embodiment) that is joined to the first floor cross member, the second floor cross member, the third floor cross member, and the fourth floor cross member from the outer side in the vehicle width direction and extends in the front-rear direction of the vehicle body; a floor tunnel (for example, a floor tunnel 24 in the embodiment) that connects the first floor cross member and the fourth floor cross member in the front-rear direction of the vehicle body and is raised upward from the floor panel to divide the second floor cross member and the third floor cross member into left and right sides in the vehicle width direction; and a front side frame (for example, a right front side frame 36 and a left front side frame 36 in the embodiment) that extends from the first floor cross member toward the front of the vehicle body. The front side frame may include: a front frame portion (for example, a front frame portion 37 in the embodiment) that extends in the front-rear direction of the vehicle body; an outer extension portion (for example, a right outer extension portion 38 and a left outer extension portion 38 in the embodiment) that extends outward in an inclined manner in the vehicle width direction from a rear end portion (for example, a rear end portion 37a in the embodiment) of the front frame portion toward the rear of the vehicle body, and is joined to a front portion (for example, a front portion 31a in the embodiment) of the side sill; and an inner extension portion (for example, a right inner extension portion 39 and a left inner extension portion 39 in the embodiment) that extends inward in an inclined manner in the vehicle width direction from the rear end portion of the front frame portion toward the rear of the vehicle body, and is joined to the first floor cross member. The front frame portion, the outer extension portion, and the inner extension portion may form a Y-shaped frame in a plan view. The battery case may be arranged inside a rectangular frame body in a plan view formed by the first floor cross member, the fourth floor cross member, and the side sill.

According to this configuration, the side sill is joined (coupled) to the first floor cross member, the second floor cross member, the third floor cross member, and the fourth floor cross member from the outer side in the vehicle width direction. In addition, the first floor cross member and the fourth floor cross member are connected in the front-rear direction of the vehicle body by the floor tunnel. Furthermore, the front side frame is formed into a Y-shaped frame, the outer extension portion is joined to the front portion of the side sill, and the inner extension portion is joined to the first floor cross member. Additionally, the first floor cross member supports the front portion (front leg) of the front seat.

Furthermore, the battery case is arranged inside the rectangular frame body in a plan view formed by the first floor cross member, the fourth floor cross member, and the side sill.

Here, the first to fourth floor cross members, the side sill, the front side frame, and the floor tunnel are highly rigid members that constitute a part of the framework of the vehicle body. In addition, the front portion of the front seat is also a highly rigid member. Thereby, the battery case can be arranged inside the rectangular frame body that constitutes a part of the framework of the vehicle body, and the battery case (particularly, the battery module) can be protected from an impact load input by a frontal collision or a side collision.

Hereinafter, the impact load input by the frontal collision may be referred to as "front collision load", and the impact load input by the side collision may be referred to as "side collision load".

For example, when a front collision load is input to the front side frame from the front of the vehicle body by a frontal collision, a part of the front collision load is transmitted to the front portion of the side sill via the outer extension portion of the front side frame and is supported by the side sill. In addition, the rest of the front collision load is transmitted to the first floor cross member via the inner extension portion of the front side frame. The front portion of the front seat and the floor tunnel are connected (joined) to the first floor cross member. Thus, the load transmitted to the first floor cross member is supported by the front portion of the front seat and the floor tunnel.

In addition, when a side collision load is input to the side sill from the side of the vehicle body by a side collision, the side collision load is transmitted to the first to fourth floor cross members via the side sill and is supported by the first to fourth floor cross members.

Thereby, the battery case (particularly, the battery module) can be protected from the front collision load and the side collision load.

(3) The floor panel may form an accommodation space (for example, an accommodation space 78 in the embodiment) for accommodating the battery case below a floor portion (for example, a main floor portion 73 in the embodiment) raised upward at the vehicle body rear of a footrest (for example, a first front footrest 61 and a second front footrest 63 in the embodiment) of an occupant (for example, occupants 66 and 68 in the embodiment) seated in the front seat.

According to this configuration, the floor panel raises the floor portion upward at the vehicle body rear of the footrest of the occupant seated in the front seat. Thereby, the footrest of the occupant seated in the front seat can be lowered below the floor portion, and a foot space of the occupant can be secured.

In addition, by raising the floor portion upward at the vehicle body rear of the footrest of the occupant seated in the front seat, a large accommodation space (accommodation space) for accommodating the battery pack below the floor portion can be secured. Thereby, a battery pack equipped with a battery module having a sufficient capacity can be accommodated under the floor portion.

In this way, the foot space of the occupant in the front seat is secured, the floor portion is raised upward and incorporated to a vehicle compartment side so that the battery module having a sufficient capacity can be accommodated, and thereby the vehicle body of the vehicle equipped with a battery pack can be configured compactly.

(4) The battery case may include a tray cross member (for example, a lower cross member 93 and an upper cross member 96 in the embodiment) that is vertically fixed to the floor longitudinal frame.

According to this configuration, the cross member of the battery case is fixed vertically to the floor longitudinal frame. Thus, the degree of freedom in the layout of the cross member (that is, the battery pack) can be increased in the front-rear direction of the vehicle body. Thereby, the cross member can be arranged at a position where the batteries can be evenly arranged in the vehicle body front and at the vehicle body rear of the cross member, and at a position where the batteries can be fixed to the floor longitudinal frame.

In this way, by arranging the batteries evenly in front of and at the rear of the cross member, the battery case (that is, the battery pack) can be miniaturized.

(5) The battery pack may include: a first battery auxiliary device (for example, a first battery auxiliary device 831 in the embodiment) arranged inside the floor tunnel in the front of the vehicle body; a second battery auxiliary device (for example, a second battery auxiliary device 832 in the embodiment) arranged at the vehicle body rear of the first battery auxiliary device and arranged inside the floor tunnel at the rear of the vehicle body; and a high-voltage electric wire (for example, an electrical wiring 84 in the embodiment) that connects the first battery auxiliary device and the second battery auxiliary device, and extends in the front-rear direction of the vehicle body across the second floor cross member inside the floor tunnel. The first battery auxiliary device may be formed higher upward as compared with the second battery auxiliary device.

According to this configuration, the first battery auxiliary device is arranged from below inside the floor tunnel in the front of the vehicle body, and the second battery auxiliary device is arranged from below inside the floor tunnel at the rear of the vehicle body. Thus, the first battery auxiliary device and the second battery auxiliary device can be arranged above the battery module. Thereby, for example, it is not necessary to arrange the first battery auxiliary device and the second battery auxiliary device around the battery module, and a sufficient battery capacity can be secured in a state that the battery pack is miniaturized.

Hereinafter, the inside of the floor tunnel in the front of the vehicle body may be referred to as "the inside of a front tunnel portion", and the inside of the floor tunnel at the rear of the vehicle body may be referred to as "the inside of a rear tunnel portion".

In addition, the first battery auxiliary device and the second battery auxiliary device are separately arranged inside the front tunnel portion and the rear tunnel portion. Furthermore, the separated first battery auxiliary device and second battery auxiliary device are connected by the high-voltage electric wire. Here, the front tunnel portion and the rear tunnel portion are formed separately in the front-rear direction of the vehicle body of the second floor cross member. That is, in the front-rear direction of the vehicle body, the high-voltage electric wire can be arranged at a position straddling the second floor cross member, and the first battery auxiliary device and the second battery auxiliary device can be arranged apart from the second floor cross member.

Thus, in the floor tunnel, only a portion corresponding to the second floor cross member can be kept lower than the other portions. Thereby, the rigidity and strength of the second floor cross member can be secured against a load input from the vehicle side by a side collision, and the battery, the first battery auxiliary device, the second battery auxiliary device, and the like can be protected from the side collision load caused by the side collision.

Furthermore, the first battery auxiliary device is formed higher upward as compared with the second battery auxiliary device. Hereinafter, the first battery auxiliary device that is higher than the second battery auxiliary device may be referred to as "tall first battery auxiliary device", and the second battery auxiliary device that is lower than the first battery auxiliary device may be referred to as "short second battery auxiliary device". The tall first battery auxiliary device may be, for example, a high-voltage junction board, and the short second battery auxiliary device may be, for example, a cutoff switch.

The tall first battery auxiliary device is arranged inside the front tunnel portion. Here, for example, by accommodating the front tunnel portion inside a center console between left and right seats of the front seat (specifically, between a driver seat and a passenger seat), the tall first battery auxiliary device can be accommodated inside the center console.

In addition, the short second battery auxiliary device is arranged inside the rear tunnel portion. Thus, a height of the rear tunnel portion can be kept low. The rear tunnel portion extends from the vehicle body rear of the front seat to (below) a central portion of the rear seat in the vehicle width direction. Thereby, by keeping the height of the rear tunnel portion low, a large space in the vehicle body front of the rear seat can be secured.

In this way, by separately arranging the tall first battery auxiliary device and the short second battery auxiliary device inside the floor tunnel in the front-rear direction of the vehicle body, an interior space of the vehicle can be widened.

(6) A pair of the second floor cross members may be arranged on two sides of the floor tunnel in the vehicle width direction. The inside of the floor tunnel may include: a first reinforcing material (for example, a first reinforcing material 245 in the embodiment) connected to the pair of the second floor cross members; and a second reinforcing material (for example, a second reinforcing material 246 in the embodiment) connected to the floor panel. The first reinforcing material and the second reinforcing material may be formed in an X-shape in a front view.

According to this configuration, the first reinforcing material and the second reinforcing material are arranged in an X-shape inside a portion (hereinafter, also referred to as central tunnel portion) of the floor tunnel corresponding to the pair of second floor cross members. Thus, the rigidity and strength of the first reinforcing material and the second reinforcing material can be secured inside the central tunnel portion. In addition, the first reinforcing material is connected to the pair of second floor cross members arranged on two sides of the floor tunnel. Furthermore, the second reinforcing material is connected to the pair of floor panels arranged on two sides of the floor tunnel.

Here, the first reinforcing material and the second reinforcing material are arranged in an X-shape. Thus, for example, the load input through the second floor cross member by a side collision can be supported by the first reinforcing material and the second reinforcing material. Thus, for example, it is not necessary to increase a plate thickness of the first reinforcing material and the second reinforcing material to reinforce the floor tunnel, and a yield strength of the first reinforcing material and the second reinforcing material can be kept low to reduce the weight.

(7) Each end portion (for example, a cross member right end portion 45*a*, a cross member left end portion 45*c*, a cross member right end portion 46*a*, and a cross member left end portion 46*c* in the embodiment) of the second floor cross member and the third floor cross member may be inclined downward toward the outer side in the vehicle width direction to the side sill. The vehicle equipped with a battery pack may include: a first inclined member (for example, an inclined member 48 in the embodiment) arranged below the floor panel in a manner of sandwiching the floor panel together with the end portion of the second floor cross member; and a second inclined member (for example, an inclined member 48 in the embodiment) arranged below the floor panel in a manner of sandwiching the floor panel together with the end portion of the third floor cross member. The first inclined member may form a closed cross section (for example, an inclined closed cross section 49 in the embodiment) extending to the side sill together with the floor panel. The second inclined member may form a closed cross section (for example, an inclined closed cross section 49 in the embodiment) extending to the side sill together with the floor panel.

According to this configuration, each end portion of the second floor cross member and the third floor cross member is inclined downward to the side sill toward the outer side in the vehicle width direction. In addition, the first inclined member and the second inclined member are arranged below the floor panel. Furthermore, the first inclined member and the floor panel form a closed cross section extending to the side sill, and the second inclined member and the floor panel form a closed cross section extending to the side sill. Thus, a portion of the floor panel in the vicinity of the side sill can be reinforced by the second floor cross member and the first inclined member, and can be reinforced by the third floor cross member and the second inclined member.

The reason for reinforcing the portion of the floor panel in the vicinity of the side sill is as follows. That is, for example, in order to increase a height of the battery pack in an up-down direction and furthermore to facilitate the getting on and off of the occupant, the floor panel may be joined along an upper end of the side sill. However, when the floor panel is joined along the upper end of the side sill, it is difficult to secure the rigidity and strength of the portion in the vicinity of the side sill against a side collision load input by a side collision.

Thus, the portion of the floor panel in the vicinity of the side sill is reinforced by the second floor cross member and the first inclined member, and further reinforced by the third floor cross member and the second inclined member to secure the rigidity and strength.

Thereby, for example, even if the floor panel is formed along the upper end of the side sill in order to increase the height of the battery pack in the up-down direction and furthermore to facilitate the getting on and off of the occupant, the load input by a side collision can be supported by the floor cross member and the inclined member.

(8) The closed cross section formed by the first inclined member and the floor panel may be larger than a closed cross section (for example, a cross member inclined closed cross section 43 in the embodiment) formed by the end portion of the second floor cross member and the floor panel, and the closed cross section formed by the second inclined member and the floor panel may be larger than a closed cross section (for example, a cross member inclined closed cross section 43 in the embodiment) formed by the end portion of the third floor cross member and the floor panel.

According to this configuration, the closed cross section of the first inclined member is made larger than the closed cross section of the second floor cross member. In addition, the closed cross section of the second inclined member is made larger than the closed cross section of the third floor cross member. Thus, the first inclined member and the second inclined member can be deformed in a manner of being bent downward with respect to the floor cross member by the load input by a side collision. Thereby, a side collision energy (impact energy) caused by a side collision can be absorbed by the first inclined member and the second inclined member.

(9) A plurality of the floor longitudinal frames may be arranged at intervals in the vehicle width direction, and the floor panel may have a bead portion (for example, a first bead portion 76 and a second bead portion 77 in the embodiment) that bulges upward in a bead shape, at least between the floor longitudinal frames adjacent to each other in the vehicle width direction.

According to this configuration, the bead portion is arranged between the floor longitudinal frames, and the bead portion is bulged upward. Thereby, for example, even if the floor longitudinal frame is raised upward between the front seat and the rear seat, a flat surface that can withstand the walking of the occupant can be formed by the bead portion that bulges upward similarly to the floor longitudinal frame.

(10) The battery case may include: a front portion (for example, a front frame 101 in the embodiment) fixed to the inner extension portion of the front side frame; a rear portion (for example, a rear frame 102 in the embodiment) fixed to the fourth floor cross member; a right side portion (for example, a right frame 103 in the embodiment) and a left side portion (for example, a left frame 104 in the embodiment) fixed to the side sill; and a central portion (for example, a lower cross member 93 and an upper cross member 96 in the embodiment) in the front-rear direction of the vehicle body fixed to the floor longitudinal frame.

According to this configuration, the front portion of the battery case is fixed to the inner extension portion of the front side frame. In addition, the rear portion of the battery case is fixed to the fourth floor cross member, and the right side portion and the left side portion of the battery pack are fixed to the side sill. Furthermore, the central portion of the battery case is fixed to the floor longitudinal frame. Thereby, a large accommodation space for the battery module can be secured inside the battery case to maximize the battery capacity of the battery pack, and furthermore the battery case (that is, the battery pack) can be stably fixed under the floor panel.

Furthermore, the central portion of the battery pack is fixed to the floor longitudinal frame. The floor longitudinal frame is a frame that extends in the front-rear direction of the vehicle body. Thus, when the layout of the battery pack is decided, for example, the battery pack can be moved in the front-rear direction of the vehicle body to some extent. That is, a center of gravity of pack of the battery pack can be arranged at the rear of a center of gravity of vehicle of the entire vehicle in the vehicle body. Thereby, for example, a rotational moment applied on the battery module can be set small, the rotational moment being caused by the side collision load input to the side portion of the vehicle, and the impact on the battery pack caused by the side collision can be mitigated.

(11) The first battery auxiliary device may be a high-voltage junction board, and the second battery auxiliary device may be a cutoff switch.

Here, the second battery auxiliary device is arranged at the vehicle body rear of the floor tunnel in the vehicle body (that is, the rear tunnel portion). The rear tunnel portion is arranged in, for example, the space between the front seat and the rear seat. Therefore, in this configuration, the second battery auxiliary device is used as a cutoff switch. Thus, the cutoff switch can be arranged in the space between the front seat and the rear seat. Thereby, for example, because the cutoff switch can be operated without moving the front seat or the rear seat, maintenance work (maintenance and inspection work) of the battery pack becomes easy.

(12) The battery case may include a tray (for example, a case portion 92 in the embodiment) on which the battery module is arranged. The tray may include: a side frame (for example, a right frame 103 and a left frame 104 in the embodiment) that forms the left side portion and the right side portion fixed to the side sill; and a tray deforming portion (for example, an easily deformable portion 161 in the embodiment) that is arranged between the side frame and the battery module and capable of absorbing an impact energy by deformation of a bottom portion (for example, a case bottom 108 in the embodiment) due to a load of a side collision.

According to this configuration, the tray deforming portion is arranged between the side frame fixed to the side sill and the battery module. Furthermore, the impact energy can be absorbed by deforming the tray deforming portion by the load of a side collision. Thereby, it is possible to reduce the interference with the battery module due to the load of a side collision. Furthermore, for example, it is possible to eliminate the need for reinforcement of a vehicle body frame (framework member) such as the side sill arranged on the outer side of the vehicle body in the vehicle width direction. Thereby, a yield strength of the vehicle body can be kept low and the weight of the vehicle body can be reduced.

DESCRIPTION OF THE EMBODIMENTS

Figure 1:
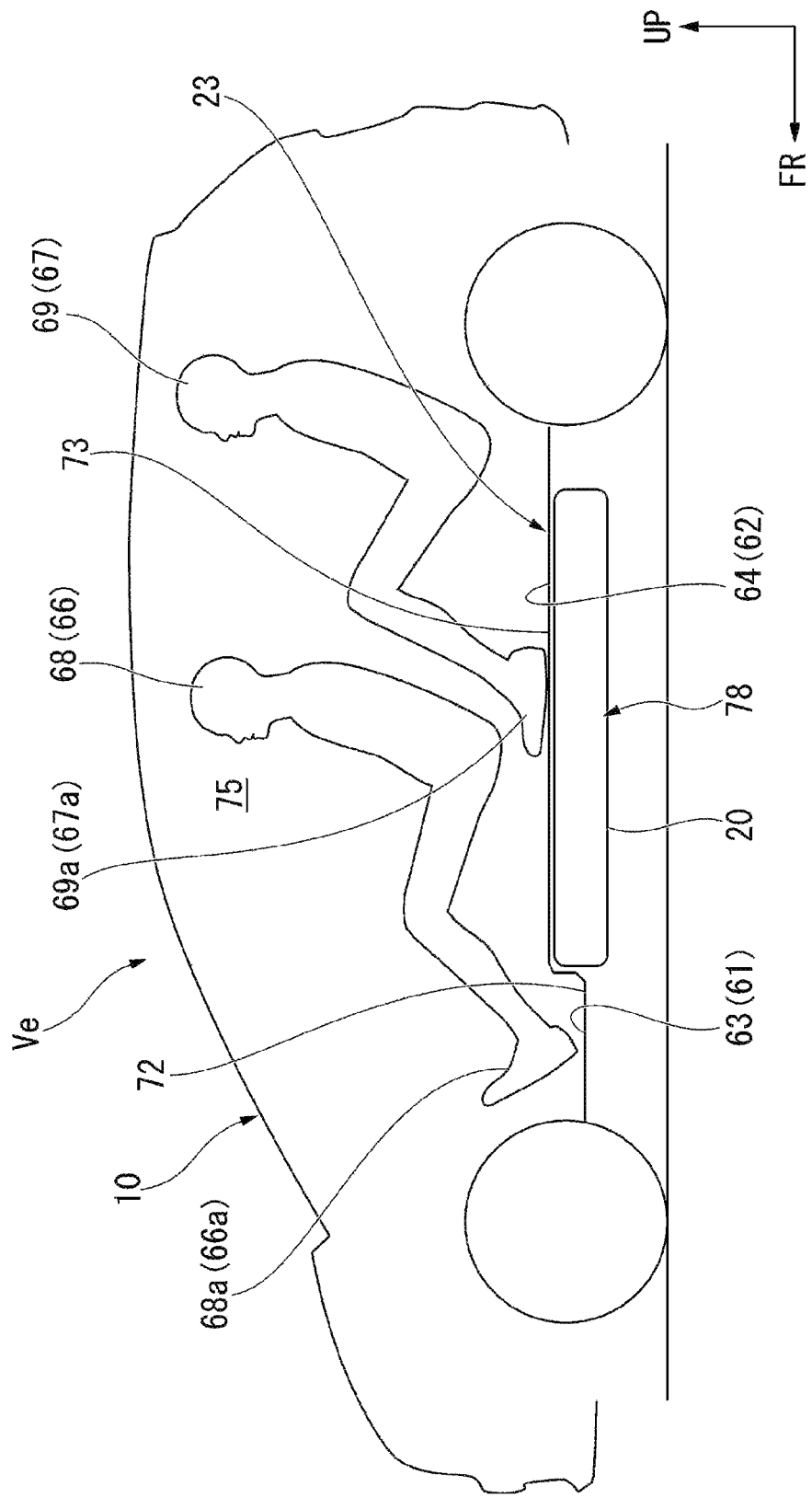
FIG. 1 is a schematic view of a vehicle equipped with a battery pack according to an embodiment of the disclosure as viewed from a left side.

The disclosure provides a vehicle equipped with a battery pack that can improve the degree of freedom in arranging (laying out) component parts such as a battery and the like, can facilitate an access of a tool to a fastening bolt for fastening the battery pack to the vehicle body, and can keep the maintenance cost low by reducing the work processes. According to the disclosure, the degree of freedom in arranging (laying out) component parts such as a battery and the like can be improved, furthermore, an access of a tool to a fastening bolt for fastening the battery pack to the vehicle body can be facilitated, and additionally, the maintenance cost can be kept low by reducing the work processes.

Hereinafter, a vehicle equipped with a battery pack according to an embodiment of the disclosure is described with reference to the drawings. In the drawing, an arrow FR indicates a front side of the vehicle, an arrow UP indicates an upper side of the vehicle, and an arrow LH indicates a left side of the vehicle. In addition, the vehicle equipped a battery pack has a substantially symmetrical configuration. Thus, hereinafter left and right constituent members are described with the same reference signs.

<Vehicle Main Body>

Figure 2:
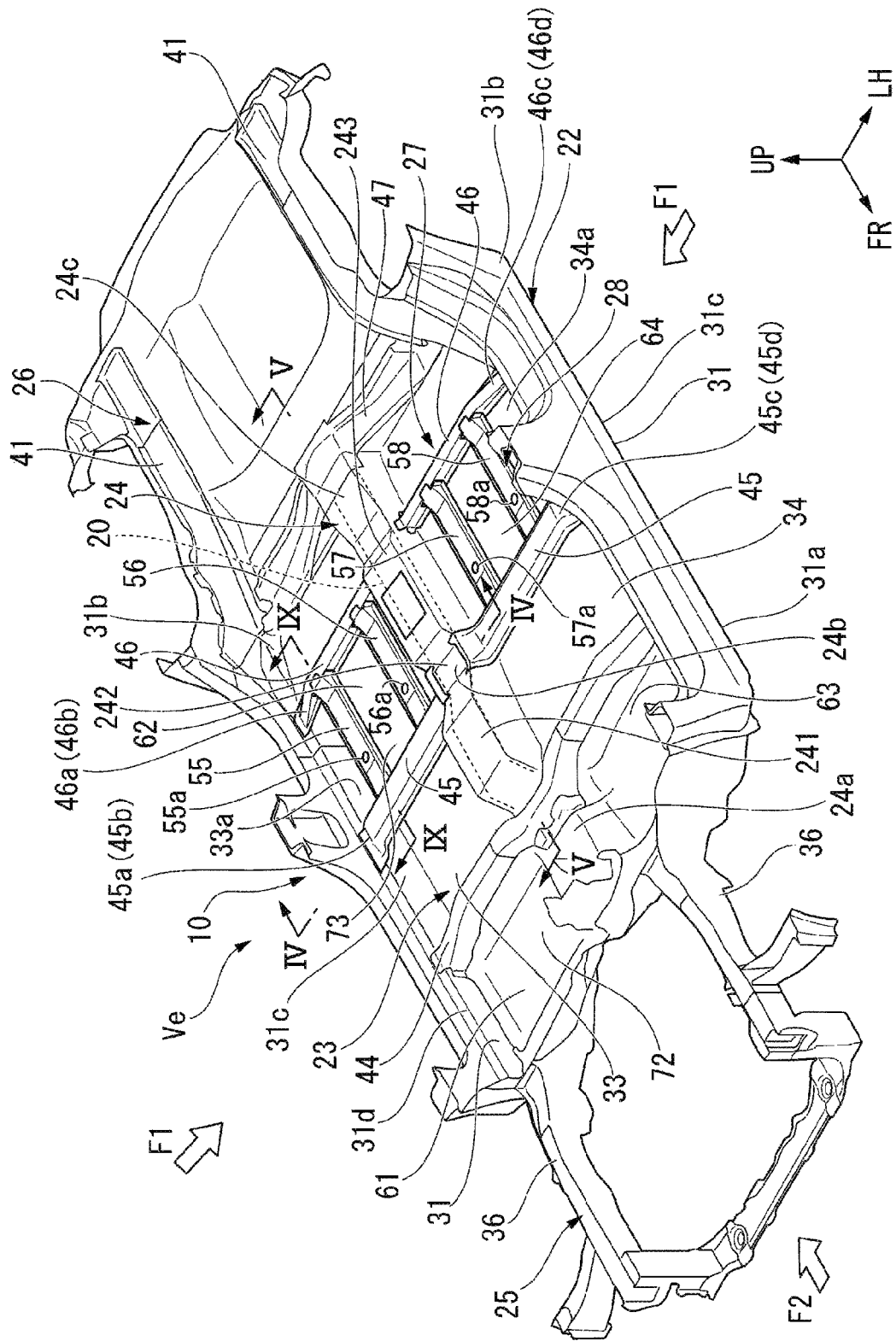
FIG. 2 is a perspective view of the vehicle equipped with a battery pack according to an embodiment of the disclosure as viewed diagonally from the front.
Figure 3:
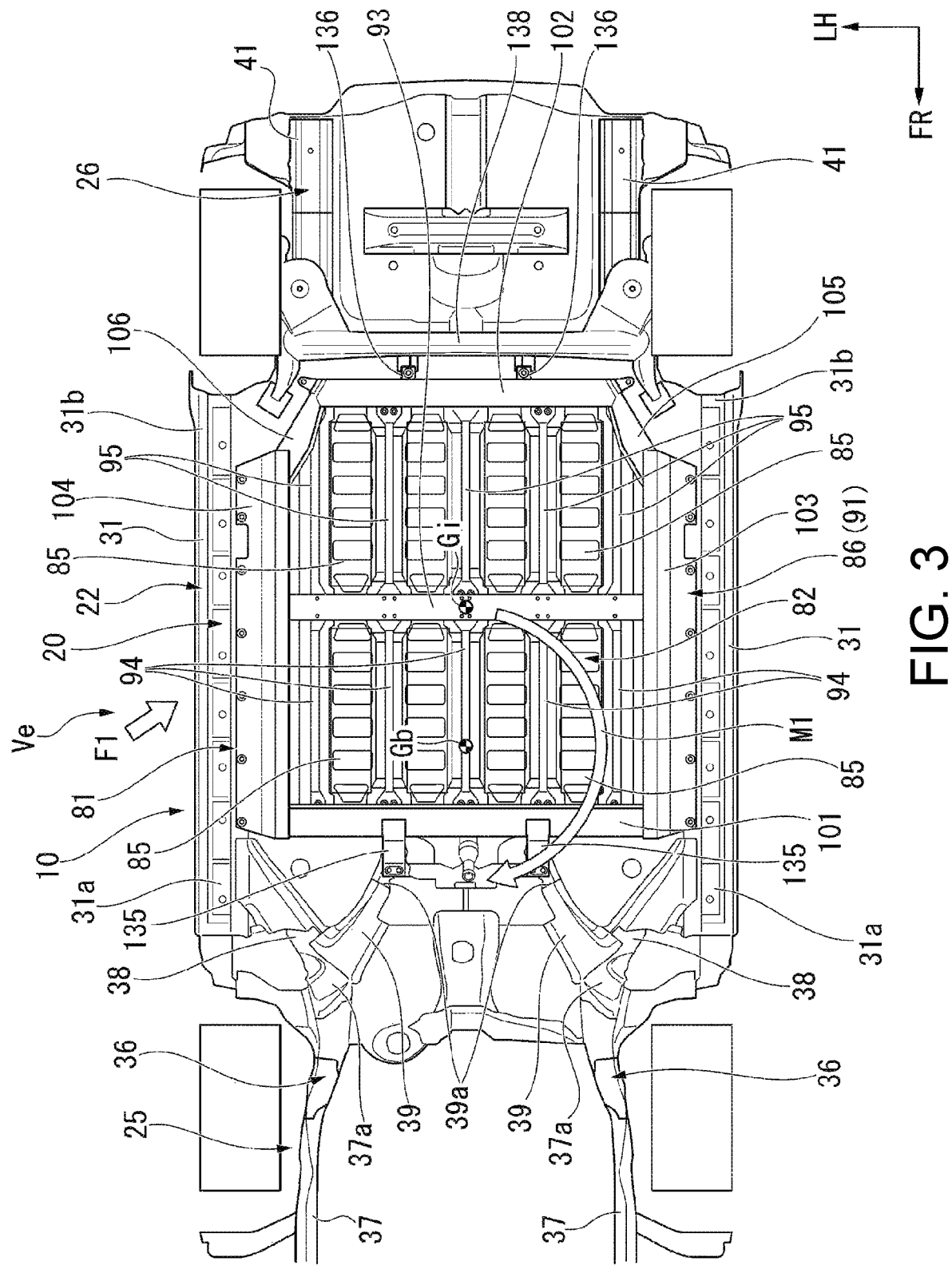
FIG. 3 is a bottom view showing the vehicle equipped with a battery pack according to an embodiment.

As shown in FIGS. 1 to 3, a vehicle Ve equipped with a battery pack includes a vehicle main body (hereinafter, also referred to as vehicle body 10) 10 and a battery pack 20. Hereinafter, the vehicle Ve equipped with a battery pack may be simply referred to as "vehicle Ve".

The vehicle main body 10 includes a side sill unit 22, a floor panel 23, a floor tunnel 24, a front side frame unit 25, a rear frame unit 26, a floor cross member unit 27, and a floor longitudinal frame unit 28.

The side sill unit 22 includes a right side sill (side sill) 31 and a left side sill (side sill) 31. The right side sill 31 is a highly rigid member that is formed in a closed cross section and constitutes a part of a framework of the vehicle body 10. The right side sill 31 is arranged on a right outer side in a vehicle width direction and extends in the front-rear direction of the vehicle body along the right outer side portion of the floor panel 23 in the vehicle width direction.

The left side sill 31 is a highly rigid member that is formed in a closed cross section and constitutes a part of the framework of the vehicle body 10. The left side sill 31 is arranged at a left outer side in the vehicle width direction and extends in the front-rear direction of the vehicle body along a left outer side portion of the floor panel 23 in the vehicle width direction.

The floor panel 23 is arranged between the left side sill 31 and the right side sill 31. The floor panel 23 is a plate-shaped member having a substantially rectangular shape in a plan view and forms a floor portion of the vehicle Ve. The floor panel 23 includes a first floor portion 33 and a second floor portion 34.

The first floor portion 33 is arranged on the right side in the vehicle width direction between the right side sill 31 and the floor tunnel 24. The second floor portion 34 is arranged on the left side in the vehicle width direction between the left side sill 31 and the floor tunnel 24.

The floor tunnel 24 is extended in the front-rear direction of the vehicle body between the first floor portion 33 and the second floor portion 34. That is, a pair of the first floor portions 33 and the second floor portions 34 are arranged on two sides of the floor tunnel 24 in the vehicle width direction. The floor tunnel 24 is raised upward from the floor panel 23. The floor tunnel 24 is described later in detail.

The front side frame unit 25 includes a right front side frame (front side frame) 36 and a left front side frame (front side frame) 36. The right front side frame 36 and the left front side frame 36 are arranged in front of the battery pack 20 in the vehicle body.

The right front side frame 36 extends toward the front of the vehicle body from a first floor cross member 44 described later. The right front side frame 36 includes a right front frame portion 37, a right outer extension portion (outer extension portion) 38, and a right inner extension portion (inner extension portion, central extension portion) 39.

The right front frame portion 37 extends to the front of the vehicle body in the vehicle body front of the right outer extension portion 38 and the right inner extension portion 39. The right outer extension portion 38 extends in an inclined manner to the outer side (right side) in the vehicle width direction from a rear end portion 37a of the right front frame portion 37 toward the rear of the vehicle body, and is joined to a front portion 31a of the right side sill 31.

The right inner extension portion 39 extends in an inclined manner to the inner side (center side) in the vehicle width direction from the rear end portion 37a of the right front frame portion 37 toward the rear of the vehicle body, and is joined to a central portion of the first floor cross member 44 described later. In addition, a rear end portion 39a of the right inner extension portion 39 is coupled to a right front support bracket 135 (described later) of the battery pack 20.

The right front side frame 36 is formed into a Y-shaped frame in a plan view by the right front frame portion 37, the right outer extension portion 38, and the right inner extension portion 39. The right front side frame 36 is a highly rigid member that is formed in a closed cross section and constitutes a part of the framework of the vehicle body 10.

The left front side frame 36 extends toward the front of the vehicle body from the first floor cross member 44 described later. The left front side frame 36 includes a left front frame portion 37, a left outer extension portion (outer extension portion) 38, and a left inner extension portion (inner extension portion, central extension portion) 39.

The left front frame portion 37 extends to the front of the vehicle body in the vehicle body front of the left outer extension portion 38 and the left inner extension portion 39. The left outer extension portion 38 extends in an inclined manner to the outer side (left side) in the vehicle width direction from a rear end portion 37a of the left front frame portion 37 toward the rear of the vehicle body, and is joined to a front portion 31a of the left side sill 31.

The left inner extension 39 extends in an inclined manner to the inner side (center side) in the vehicle width direction from the rear end portion 37a of the left front frame portion 37 toward the rear of the vehicle body, and is joined to the central portion of the first floor cross member 44 described later. In addition, a rear end portion 39a of the left inner extension portion 39 is joined to a right front support bracket 135 (described later) of the battery pack 20.

The left front side frame 36 is formed into a Y-shaped frame in a plan view by the left front frame portion 37, the left outer extension portion 38, and the left inner extension portion 39. The left front side frame 36 is a highly rigid member that is formed in a closed cross section and constitutes a part of the framework of the vehicle body 10.

The rear frame unit 26 has a right rear frame 41 and a left rear frame 41. The right rear frame 41 and the left rear frame 41 are arranged at the rear of the battery pack 20 in the vehicle body.

The right rear frame 41 extends from a rear end portion 31b of the right side sill 31 toward the rear of the vehicle body and is formed in a substantially J-shape in a plan view. The right rear frame 41 is a highly rigid member that is formed in a closed cross section and constitutes a part of the framework of the vehicle body 10.

The left rear frame 41 extends from a rear end portion 31b of the left side sill 31 toward the rear of the vehicle body and is formed in a substantially J-shape in a plan view. The left rear frame 41 is a highly rigid member that is formed in a closed cross section and constitutes a part of the framework of the vehicle body 10.

The floor cross member unit 27 is arranged between the right side sill 31 and the left side sill 31, and is joined along an upper surface of the floor panel 23.

The floor cross member unit 27 includes the first floor cross member 44, a right second floor cross member 45, a left second floor cross member 45, a right third floor cross member 46, and a left third floor cross member 46, and a fourth floor cross member 47.

The first floor cross member 44 is arranged in a front portion 24a of the floor tunnel 24. A pair of the right second floor cross member 45 and the left second floor cross member 45 is arranged on two sides of the floor tunnel 24 in the vehicle width direction at the vehicle body rear of the first floor cross member 44.

A pair of the right third floor cross member 46 and the left third floor cross member 46 is arranged on two sides of the floor tunnel 24 in the vehicle width direction at the vehicle body rear of the right second floor cross member 45 and the left second floor cross member 45.

The right third floor cross member 46 extends in the vehicle width direction along the right second floor cross member 45, and is connected via a first floor longitudinal frame 55 and a second floor longitudinal frame 56 described later. The left third floor cross member 46 extends in the vehicle width direction along the left second floor cross member 45, and is connected via a third floor longitudinal frame 57 and a fourth floor longitudinal frame 58 described later.

The fourth floor cross member 47 is arranged at a rear end portion 24c of the floor tunnel 24.

The right side sill 31 is joined (coupled) to a right end portion of the first floor cross member 44, a right end portion 45a of the right second floor cross member 45, a right end portion 46a of the right third floor cross member 46, and a right end portion of the fourth floor cross member 47 from the right outer side in the vehicle width direction.

The left side sill 31 is joined (coupled) to a left end portion of the first floor cross member 44, a left end portion 45c of the left second floor cross member 45, a left end portion 46c of the left third floor cross member 46, and a left end portion of the fourth floor cross member 47 from the left outer side in the vehicle width direction.

The first floor cross member 44 extends in the vehicle width direction on the floor panel 23 between the vicinity of the front portion 31a of the right side sill 31 and the vicinity of the front portion 31a of the left side sill 31. The central portion of the first floor cross member 44 in the vehicle width direction is joined to the front portion 24a of the floor tunnel 24. The first floor cross member 44 forms a closed cross section together with the floor panel 23 for example. The first floor cross member 44 extends, for example, in the vehicle width direction along the right and left second floor cross members 45 and 45 in the vehicle body front of the right second floor cross member 45 and the left second floor cross member 45 described later.

Figure 4:
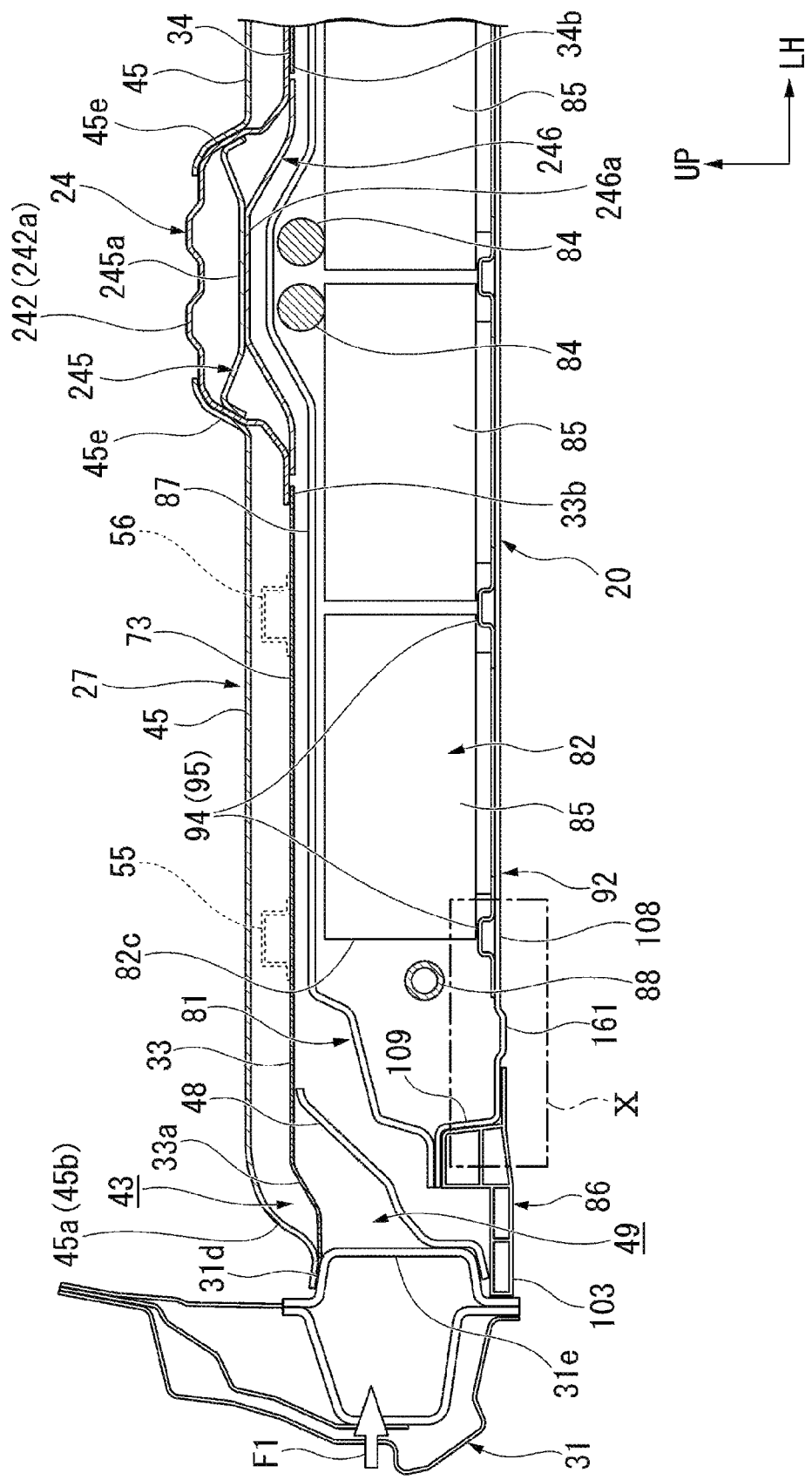
FIG. 4 is a cross-sectional view in which the vehicle equipped with a battery pack in FIG. 2 is fractured at line IV-IV.

As shown in FIGS. 2 and 4, the right second floor cross member 45 is extended in the vehicle width direction between a center 31c of the right side sill 31 and a center 24b of the floor tunnel 24. The right second floor cross member 45 is raised from the upper surface of the first floor portion 33 and forms a closed cross section with the first floor portion 33. A top portion 45b of a right end portion (end portion) 45a of the right second floor cross member 45 is inclined downward toward a right outer side in the vehicle width direction to the center 31c of the right side sill 31. Hereinafter, the right end portion 45a of the right second floor cross member 45 may also be referred to as "cross member right end portion 45a".

A cross member inclined closed cross section (closed cross section) 43 is formed by the cross member right end portion 45a and a right end portion 33a of the first floor portion 33.

An inclined member (first inclined member) 48 is arranged below the cross member right end portion 45a. The inclined member 48 is arranged below the first floor portion 33 (specifically, the right end portion 33a) in a manner of sandwiching the right end portion (the portion in the vicinity of the side sill 31) 33a of the first floor portion 33 together with the cross member right end portion 45a.

The inclined member 48 forms an inclined closed cross section (closed cross section) 49 to the center 31c of the right side sill 31 together with the right end portion 33a of the first floor portion 33. Thus, the right end portion 33a of the first floor portion 33 is reinforced by the right second floor cross member 45 and the inclined member 48. Here, the inclined closed cross section 49 is formed larger than the cross member inclined closed cross section 43.

Hereinafter, the left second floor cross member 45, the right third floor cross member 46, and the left third floor cross member 46 are described. Note that, in the following description, for the sake of convenience, the cross member inclined closed cross section, the inclined member, and the inclined closed cross section are described with the same signs as the cross member inclined closed cross section 43, the inclined member 48, and the inclined closed cross section 49 described for the right second floor cross member 45.

The left second floor cross member 45 is extended in the vehicle width direction between the center 31c of the left side sill 31 and the center 24b of the floor tunnel 24. The left second floor cross member 45 is raised from the upper surface of the second floor portion 34 and forms a closed cross section with the second floor portion 34. A top portion 45d of a left end portion (end portion) 45c of the left second floor cross member 45 is inclined downward toward the left outer side in the vehicle width direction to the center 31c of the left side sill 31. Hereinafter, the left end portion 45c of the left second floor cross member 45 may also be referred to as "cross member left end portion 45c".

The cross member inclined closed cross section (closed cross section) 43 (not shown) is formed by the cross member left end portion 45c and a left end portion 34a of the second floor portion 34.

An inclined member (first inclined member) 48 (not shown) is arranged below the cross member left end portion 45c. The inclined member 48 is arranged below the second floor portion 34 (specifically, the left end portion 34a) in a manner of sandwiching the left end portion (the portion in the vicinity of the side sill 31) 34a of the second floor portion 34 together with the cross member left end portion 45c.

The inclined member 48 forms the inclined closed cross section (closed cross section) 49 (not shown) to the center 31c of the left side sill 31 together with the left end portion 34a of the second floor portion 34. Thus, the left end portion 34a of the second floor portion 34 is reinforced by the left second floor cross member 45 and the inclined member 48. Here, the inclined closed cross section 49 is formed larger than the cross member inclined closed cross section 43.

The right third floor cross member 46 is extended in the vehicle width direction on the first floor portion 33 between the vicinity of the rear end portion 31b of the right side sill 31 and the vicinity of a rear end portion 24c of the floor tunnel 24. The right third floor cross member 46 is raised from the upper surface of the first floor portion 33 and forms a closed cross section with the first floor portion 33. A top portion 46b of a right end portion (end portion) 46a of the right third floor cross member 46 is inclined downward toward the outer side in the vehicle width direction to the vicinity of the rear end portion 31b of the right side sill 31. Hereinafter, the right end portion 46a of the right third floor cross member 46 may also be referred to as "cross member right end portion 46a".

The cross member inclined closed cross section (closed cross section) 43 (not shown) is formed by the cross member right end portion 46a and the right end portion 33a of the first floor portion 33.

An inclined member (second inclined member) 48 (not shown) is arranged below the cross member right end portion 46a. The inclined member 48 is arranged below the first floor portion 33 (specifically, the right end portion 33a) in a manner of sandwiching the right end portion (the portion in the vicinity of the side sill 31) 33a of the first floor portion 33 together with the cross member right end portion 46a.

The inclined member 48 forms the inclined closed cross section (closed cross section) 49 (not shown) to the vicinity of the rear end portion 31b of the right side sill 31 together with the right end portion 33a of the first floor portion 33. Thus, the right end portion 33a of the first floor portion 33 can be reinforced by the right third floor cross member 46 and the inclined member 48. Here, the inclined closed cross section 49 is formed larger than the cross member inclined closed cross section 43.

The left third floor cross member 46 is extended in the vehicle width direction on the second floor portion 34 between the vicinity of the rear end portion 31b of the left side sill 31 and the vicinity of the rear end portion 24c of the floor tunnel 24. The left third floor cross member 46 is raised from the upper surface of the second floor portion 34 and forms a closed cross section with the second floor portion 34. A top portion 46d of a left end portion (end portion) 46c of the left third floor cross member 46 is inclined downward toward the outer side in the vehicle width direction to the vicinity of the rear end portion 31b of the left side sill 31. Hereinafter, the left end portion 46c of the left third floor cross member 46 may also be referred to as "cross member left end portion 46c".

The cross member inclined closed cross section (closed cross section) 43 (not shown) is formed by the cross member left end portion 46c and the left end portion 34a of the second floor portion 34.

An inclined member (second inclined member) 48 (not shown) is arranged below the cross member left end portion 46c. The inclined member 48 is arranged below the second floor portion 34 (specifically, the left end portion 34a) in a manner of sandwiching the left end portion (the portion in the vicinity of the side sill 31) 34a of the second floor portion 34 together with the cross member left end portion 46c.

The inclined member 48 forms the inclined closed cross section (closed cross section) 49 (not shown) to the vicinity of the rear end portion 31b of the left side sill 31 together with the left end portion 34a of the second floor portion 34. Thus, the left end portion 34a of the second floor portion 34 can be reinforced by the left third floor cross member 46 and the inclined member 48. Here, the inclined closed cross section 49 is formed larger than the cross member inclined closed cross section 43.

Moreover, in the description of the right and left second floor cross members 45 and 45 and the right and left third floor cross sections 46 and 46, the reason for making the inclined closed cross section 49 larger than the cross member inclined closed cross section 43 is described later in detail.

The fourth floor cross member 47 extends in the vehicle width direction along the right third floor cross member 46 and the left third floor cross member 46 at the vehicle body rear of the right third floor cross member 46 and the left third floor cross member 46.

The fourth floor cross member 47 extends in the vehicle width direction on the floor panel 23 between the rear end portion 31b of the right side sill 31 and the rear end portion 31b of the left side sill 31. The central portion of the fourth floor cross member 47 in the vehicle width direction is joined to the rear end portion 24c of the floor tunnel 24.

The first floor cross member 44, the fourth floor cross member 47, the right side sill 31, and the left side sill 31 are formed into a rectangular frame body in a plan view.

As shown in FIG. 2, the floor tunnel 24 intersects with the first floor cross member 44, the right and left second floor cross members 45 and 45, the right and left third floor cross members 46 and 46, and the fourth floor cross member 47, and extends in the front-rear direction of the vehicle body. In the embodiment, the floor tunnel 24 extends orthogonally.

In other words, the floor tunnel 24 connects (links) the first floor cross member 44 and the fourth floor cross member 47 in the front-rear direction of the vehicle body. In addition, the floor tunnel 24 is raised upward from the floor panel 23 and thereby the right second floor cross member 45 and the left second floor cross member 45 are divided into left and right sides (two sides) in the vehicle width direction. Furthermore, the floor tunnel 24 divides the right third floor cross member 46 and the left third floor cross member 46 into left and right sides (two sides) in the vehicle width direction.

The floor tunnel 24 has a front tunnel portion 241, a central tunnel portion 242, and a rear tunnel portion 243. The front tunnel portion 241 is formed in front of the right and left second floor cross members 45 and 45 in the vehicle body in the vicinity of the front portion 24a of the floor tunnel 24 (that is, in the vehicle body front of the floor tunnel 24).

The central tunnel portion 242 is formed at a portion (the center 24b of the floor tunnel 24) corresponding to the right and left second floor cross members 45 and 45 at the vehicle body rear of the front tunnel portion 241. The rear tunnel portion 243 is formed at a latter half portion of the floor tunnel 24 at the rear of the central tunnel portion 242 and the right and left second floor cross members 45 and 45 in the vehicle body (that is, at the vehicle body rear of the floor tunnel 24).

Hereinafter, the inside of the floor tunnel 24 in the front of the vehicle body may be referred to as "the inside of the front tunnel portion 241", and the inside of the floor tunnel 24 at the rear of the vehicle body may be referred to as "the inside of the rear tunnel portion 243".

Figure 5:
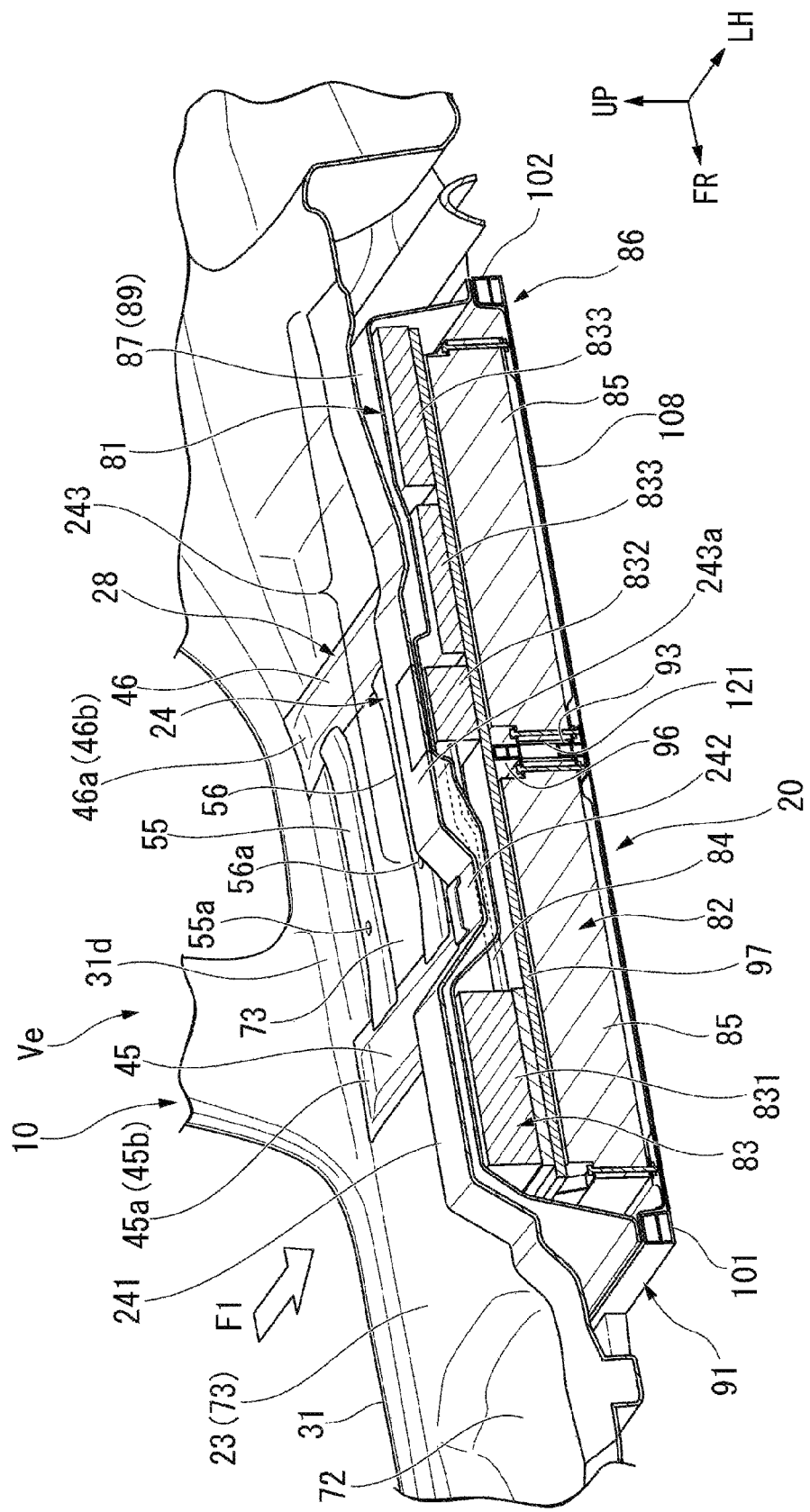
FIG. 5 is a perspective view in which the vehicle equipped with a battery pack in FIG. 2 is fractured at line VV.

As shown in FIGS. 4 and 5, the front tunnel portion 241 is raised higher upward from the floor panel 23 as compared with the central tunnel portion 242 and the rear tunnel portion 243. In addition, the central tunnel portion 242 is raised less upward from the floor panel 23 as compared with the rear tunnel portion 243.

A pair of the right second floor cross member 45 and the left second floor cross member 45 is arranged on two sides of the central tunnel portion 242 in the vehicle width direction (see also FIG. 2).

Here, a height of the central tunnel portion 242 from the floor panel 23 is kept low. Thus, each inner end portion 45e of the right second floor cross member 45 and the left second floor cross member 45 extends to a top portion 242a of the central tunnel portion 242. Thereby, the right second floor cross member 45 and the left second floor cross member 45 are formed into a state of being integrally continuous in the vehicle width direction via the top portion 242a of the central tunnel portion 242. Thus, the rigidity and strength of the right second floor cross member 45 and the left second floor cross member 45 in the vehicle width direction are secured.

A first reinforcing material 245 and a second reinforcing material 246 are arranged inside the central tunnel portion 242. The first reinforcing material 245 and the second reinforcing material 246 are joined in a state that central portions 245a and 246a formed flat are overlapped in the up-down direction. Both end portions of the first reinforcing material 245 in the vehicle width direction are inclined upward from the central portion 245a toward the outer side in the vehicle width direction. Both end portions of the first reinforcing member 245 in the vehicle width direction are respectively connected to each inner end portion 45e of the pair of the right second floor cross member 45 and the left second floor cross member 45 via the central tunnel portion 242.

In addition, the first floor portion 33 and the second floor portion 34 are arranged on two sides of the central tunnel portion 242 in the vehicle width direction. Both end portions of the second reinforcing member 246 in the vehicle width direction are inclined downward from the central portion 246a toward the outer side in the vehicle width direction. Both end portions of the second reinforcing member 246 in the vehicle width direction are respectively connected to a pair of an inner end portion 33b of the first floor portion 33 and an inner end portion 34b of the second floor portion 34 via the central tunnel portion 242.

Here, the first reinforcing member 245 and the second reinforcing member 246 are integrally formed in a substantially X-shape (X-shape) in a front view. Thereby, the rigidity and strength of the first reinforcing material 245 and the second reinforcing material 246 are secured inside the central tunnel portion 242.

Thus, for example, an impact load (load) F1 input through the right and left second floor cross members 45 and 45 by a side collision can be supported by the first reinforcing member 245 and the second reinforcing member 246. Thereby, for example, it is not necessary to increase a plate thickness of the first reinforcing material 245 and the second reinforcing material 246 to reinforce the central tunnel portion 242 (that is, the floor tunnel 24), and a yield strength of the first reinforcing material 245 and the second reinforcing material 246 can be kept low to reduce the weight.

As shown in FIGS. 2 and 5, the floor longitudinal frame unit 28 has a plurality of first to fourth floor longitudinal frames (floor longitudinal frames) 55 to 58 spaced apart on the floor panel 23 in the vehicle width direction. Specifically, the floor longitudinal frame unit 28 includes the first floor longitudinal frame 55 and the second floor longitudinal frame 56 arranged on the first floor portion 33, and the third floor longitudinal frame 57 and the fourth floor longitudinal frame 58 arranged on the second floor portion 34.

The first floor longitudinal frame 55 and the second floor longitudinal frame 56 are arranged apart from each other on the first floor portion 33 in the vehicle width direction. The first floor longitudinal frame 55 intersects (in the embodiment, be orthogonal to) the right second floor cross member 45 and the right third floor cross member 46, and extends in the front-rear direction of the vehicle body. Similarly, the second floor longitudinal frame 56 intersects (in the embodiment, be orthogonal to) the right second floor cross member 45 and the right third floor cross member 46, and extends in the front-rear direction of the vehicle body.

The first floor longitudinal frame 55 and the second floor longitudinal frame 56 are raised upward from the first floor portion 33 (that is, the floor panel 23), and form a closed cross section together with the first floor portion 33. Each front end portion of the first floor longitudinal frame 55 and the second floor longitudinal frame 56 is joined (coupled) to the right second floor cross member 45, and each rear end portion of the first floor longitudinal frame 55 and the second floor longitudinal frame 56 is joined (coupled) to the right third floor cross member 46. Note that, the number of the first floor longitudinal frame 55 and the second floor longitudinal frame 56 arranged on the first floor portion 33 can be arbitrarily selected.

The third floor longitudinal frame 57 and the fourth floor longitudinal frame 58 are arranged apart from each other on the second floor portion 34 in the vehicle width direction. The third floor longitudinal frame 57 intersects (in the embodiment, be orthogonal to) the left second floor cross member 45 and the left third floor cross member 46, and extends in the front-rear direction of the vehicle body. Similarly, the fourth floor longitudinal frame 58 intersects (in the embodiment, be orthogonal to) the left second floor cross member 45 and the left third floor cross member 46, and extends in the front-rear direction of the vehicle body.

The third floor longitudinal frame 57 and the fourth floor longitudinal frame 58 are raised upward from the second floor portion 34 (that is, the floor panel 23), and form a closed cross section together with the second floor portion 34. Each front end portion of the third floor longitudinal frame 57 and the fourth floor longitudinal frame 58 is joined (coupled) to the left second floor cross member 45, and each rear end portion of the third floor longitudinal frame 57 and the fourth floor longitudinal frame 58 is joined (coupled) to the left third floor cross member 46. Note that, the number of the third floor longitudinal frame 57 and the fourth floor longitudinal frame 58 arranged on the second floor portion 34 can be arbitrarily selected.

Figure 6:
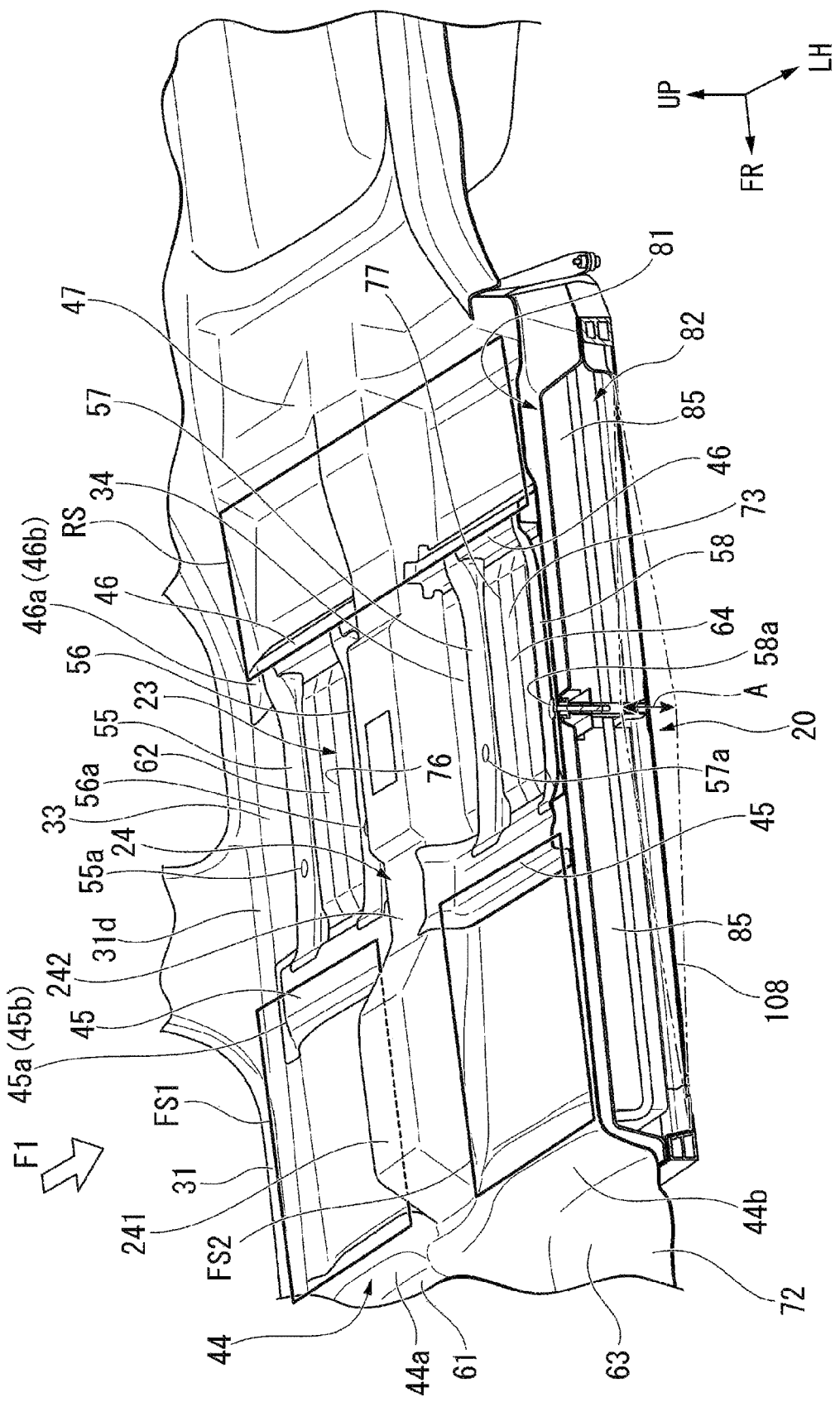
FIG. 6 is a perspective view illustrating a positional relationship between a front seat and a rear seat of the vehicle equipped with a battery pack according to an embodiment.

As shown in FIG. 6, a front portion (front leg) of a right front seat (front seat) FS1 is fixed to a right half portion 44a of the first floor cross member 44 and is supported thereby. A rear portion (rear leg) of the right front seat (front seat) FS1 is fixed to the right second floor cross member 45 and is supported thereby.

In addition, a front portion (front leg) of a left front seat (front seat) FS2 is fixed to a left half portion 44b of the first floor cross member 44 and is supported thereby. A rear portion (rear leg) of the left front seat (front seat) FS2 is fixed to the left second floor cross member 45 and is supported thereby.

Here, the front tunnel portion 241 of the floor tunnel 24 is arranged between the first floor cross member 44 and the right and left second floor cross members 45 and 45 in the front-rear direction of the vehicle body. That is, the front tunnel portion 241 is arranged between the right front seat FS1 and the left front seat FS2. Thus, the front tunnel portion 241 can be accommodated inside, for example, a center console (not shown).

In addition, a front portion (front leg) of a rear seat RS is fixed to the right third floor cross member 46 and the left third floor cross member 46 and is supported thereby.

As shown in FIGS. 1, 2, and 6, the first floor portion 33 has a first front footrest (footrest) 61 and a first rear footrest (footrest) 62.

The first front footrest 61 is arranged at a portion in front of the battery pack 20 in the vehicle body. Feet 66a of an occupant 66 seated in the right front seat (front seat) FS1 are placed on the first front footrest 61. The first rear footrest 62 is arranged at a portion above the battery pack 20 and between the first floor longitudinal frame 55 and the second floor longitudinal frame 56. Feet 67a of an occupant 67 seated in a right half portion of the rear seat RS are placed on the first rear footrest 62.

In addition, the second floor portion 34 has a second front footrest (footrest) 63 and a second rear footrest (footrest) 64.

The second front footrest 63 is arranged at a portion in front of the battery pack 20 in the vehicle body. Feet 68a of an occupant 68 seated in the left front seat FS2 are placed on the second front footrest 63. The second rear footrest 64 is arranged at a portion above the battery pack 20 and between the third floor longitudinal frame 57 and the fourth floor longitudinal frame 58. Feet 69a of an occupant 69 seated in a left half portion of the rear seat RS are placed on the second rear footrest 64.

Note that, in the embodiment, an example in which the first front footrest 61, the second front footrest 63, the first rear footrest 62, and the second rear footrest 64 are arranged in the floor panel 23 has been described, but the disclosure is not limited thereto. As another example, for example, either the first front footrest 61 and the second front footrest 63 or the first rear footrest 62 and the second rear footrest 64 may be arranged in the floor panel 23.

In addition, in the floor panel 23, a front floor portion 72 is formed at a portion in the vehicle body front of the battery pack 20, and a main floor portion (floor portion) 73 is formed at a portion above the battery pack 20. The front floor portion 72 has the first front footrest 61 and the second front footrest 63.

The main floor portion 73 has the first rear footrest 62 and the second rear footrest 64. The main floor portion 73 is joined to each upper end 31d of the right side sill 31 and the left side sill 31 (the left upper end 31d is not shown). By joining the main floor portion 73 to each upper end 31d of the right side sill 31 and the left side sill 31, a boundary between the main floor portion 73 and the right side sill 31 can be formed flat without any step in the up-down direction. Also, a boundary between the main floor portion 73 and the left side sill 31 can be formed flat without any step in the up-down direction. Thereby, for example, the occupants 66 to 69 can easily get on and off the vehicle Ve equipped with a battery pack.

As shown in FIGS. 1, 2, and 4, the main floor portion 73 is joined to each upper end 31d of the right side sill 31 and the left side sill 31 to facilitate the entry and exit of the occupants 66 to 69. Therefore, it is difficult to secure the rigidity and strength of the portion in the vicinity of the right side sill 31 and the left side sill 31 against an impact load input by a side collision (hereinafter referred to as side collision load) F1.

Thus, as described above, the cross member right end portion 45a and the inclined member 48 are arranged in a portion (right end portion) of the main floor portion 73 in the vicinity of the right side sill 31 to reinforce this portion. The inclined member 48 and the main floor portion 73 form a closed cross section extending to the right side sill 31.

The cross member right end portion 46a and the inclined member 48 (not shown) are arranged in a portion (right end portion) of the main floor portion 73 in the vicinity of the right side sill 31 to reinforce this portion. The inclined member 48 and the main floor portion 73 form a closed cross section extending to the right side sill 31.

The cross member left end portion 45c and the inclined member 48 (not shown) are arranged in a portion (left end portion) of the main floor portion 73 in the vicinity of the left side sill 31 to reinforce this portion. The inclined member 48 and the main floor portion 73 form a closed cross section extending to the left side sill 31.

The cross member left end portion 46c and the inclined member 48 (not shown) are arranged in a portion (left end portion) of the main floor portion 73 in the vicinity of the left side sill 31 to reinforce the vicinity portion. The inclined member 48 and the main floor portion 73 form a closed cross section extending to the left side sill 31.

Thus, the rigidity and strength of the right end portion of the main floor portion 73 on the right side sill 31 side and the left end portion of the main floor portion 73 on the left side sill 31 side can be secured. This allows, for example, the side collision load F1 input by a side collision to be supported by the right and left second floor cross members 45 and 45, the right and left third floor cross members 46 and 46, the inclined member 48, and the like. Therefore, the main floor portion 73 can be formed along each upper end 31d of the right side sill 31 and the left side sill 31, and the occupant can easily get on and off.

Furthermore, by joining the main floor portion 73 to each upper end 31d of the right side sill 31 and the left side sill 31, for example, a height of the main floor portion 73 can be increased. Thereby, for example, a height of the battery pack 20 in the up-down direction can be increased.

As shown in FIGS. 1, 2, and 6, in the main floor portion 73, the first rear footrest 62 is arranged between the first floor longitudinal frame 55 and the second floor longitudinal frame 56, and the second rear footrest 64 is arranged between the third floor longitudinal frame 57 and the fourth floor longitudinal frame 58. Thereby, the first rear footrest 62 and the second rear footrest 64 can be lowered downward to a position close to the battery pack 20.

In addition, the first front footrest 61 and the second front footrest 63 are arranged in the front floor portion 72. The front floor portion 72 is arranged in front of the battery pack 20 in the vehicle body and below the main floor portion 73. Thus, the first front footrest 61 and the second front footrest 63 are arranged below the first rear footrest 62 and the second rear footrest 64.

In this way, the first front footrest 61 and the second front footrest 63 are arranged to be lowered further downward than the first rear footrest 62 and the second rear footrest 64 (that is, the main floor portion 73). Thereby, a foot space for the occupants 66 and 68 seated in the right front seat FS1 and the left front seat FS2 can be secured.

Furthermore, at the vehicle body rear of the first front footrest 61 and the second front footrest 63, the main floor portion 73 is raised upward so as to be incorporated to an interior space (vehicle compartment) 75 side. Thus, a large accommodation space (accommodation space) 78 below the main floor portion 73 can be secured. The battery pack 20 (that is, a battery case 81 described later) is accommodated in the accommodation space 78. Thereby, the battery pack 20 provided with a battery module 82 (described later) having a sufficient capacity can be accommodated below the main floor portion 73.

In this way, the main floor portion 73 is raised upward so that the foot space for the occupants 66 and 68 seated in the right front seat FS1 and the left front seat FS2 can be secured and the battery module 82 having a sufficient capacity can be accommodated. Thereby, the vehicle body 10 of the vehicle Ve equipped with a battery pack can be compactly configured.

Here, the main floor portion 73 has a plurality of first bead portions (bead portions) 76 and a plurality of second bead portions (bead portions) 77.

A plurality of first bead portions 76 (three in the embodiment) are formed in the vehicle width direction between the first floor longitudinal frame 55 and the second floor longitudinal frame 56 adjacent to each other in the vehicle width direction. In the embodiment, three first bead portions 76 are illustrated as the plurality of first bead portions 76, but the number of the first bead portion 76 can be appropriately selected.

The first bead portion 76 is bulged upward in a bead shape, similar to the first floor longitudinal frame 55 and the second floor longitudinal frame 56. Furthermore, the first bead portion 76 extends in the front-rear direction of the vehicle body between the right second floor cross member 45 and the right third floor cross member 46.

Thus, even if the first floor longitudinal frame 55 and the second floor longitudinal frame 56 are raised upward between the right front seat FS1 and the right half portion of the rear seat RS, the plurality of first bead portions 76 can form a flat surface. Thereby, between the right front seat FS1 and the right half portion of the rear seat RS, for example, a flat surface that can withstand the walking of the occupant 67 seated in the right half portion of the rear seat RS can be formed.

A plurality of second bead portions 77 (three in the embodiment) are formed between the third floor longitudinal frame 57 and the fourth floor longitudinal frame 58 adjacent to each other in the vehicle width direction. In the embodiment, three second bead portions 77 are illustrated as the plurality of second bead portions 77, but the number of the second bead portion 77 can be appropriately selected.

The second bead portion 77 is bulged upward in a bead shape, similarly to the third floor longitudinal frame 57 and the fourth floor longitudinal frame 58. Furthermore, the second bead portion 77 extends in the front-rear direction of the vehicle body between the left second floor cross member 45 and the left third floor cross member 46.

Thus, even if the third floor longitudinal frame 57 and the fourth floor longitudinal frame 58 are raised upward between the left front seat FS2 and the left half portion of the rear seat RS, the plurality of second bead portions 77 can form a flat surface. Thereby, between the left front seat FS2 and the left half portion of the rear seat RS, for example, a flat surface that can withstand the walking of the occupant 69 seated in the left half portion of the rear seat RS can be formed.

Moreover, in the embodiment, an example has been described in which the first bead portion 76 is formed between the first floor longitudinal frame 55 and the second floor longitudinal frame 56, and the second bead portion 77 is formed between the third floor longitudinal frame 57 and the fourth floor longitudinal frame 58, but the disclosure is not limited thereto. As another example, the first bead portion 76 may be formed in another portion in addition to the portion between the first floor longitudinal frame 55 and the second floor longitudinal frame 56. In addition, the second bead portion 77 may be formed in another portion in addition to the portion between the third floor longitudinal frame 57 and the fourth floor longitudinal frame 58.

<Battery Pack>

As shown in FIGS. 1 to 3, the battery pack 20 is arranged below the main floor portion 73 (that is, below the floor of the vehicle Ve). In addition, the battery pack 20 is arranged below the right and left second floor cross members 45 and 45, the right and left third floor cross members 46 and 46, and the first to fourth floor longitudinal frames 55 to 58.

Furthermore, the battery pack 20 has the battery case 81, which is described later, arranged inside a rectangular frame body in a plan view formed by the first floor cross member 44, the fourth floor cross member 47, the right side sill 31, and the left side sill 31.

Figure 7:
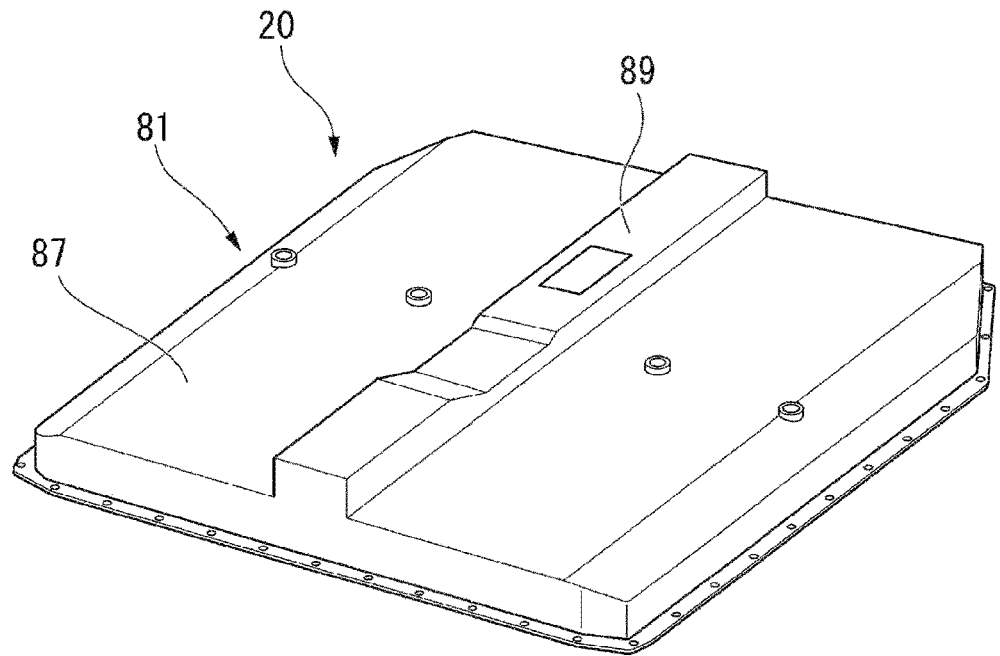
FIG. 7 is an exploded perspective view showing a state in which a case cover is removed from a battery pack according to an embodiment.
Figure 7:
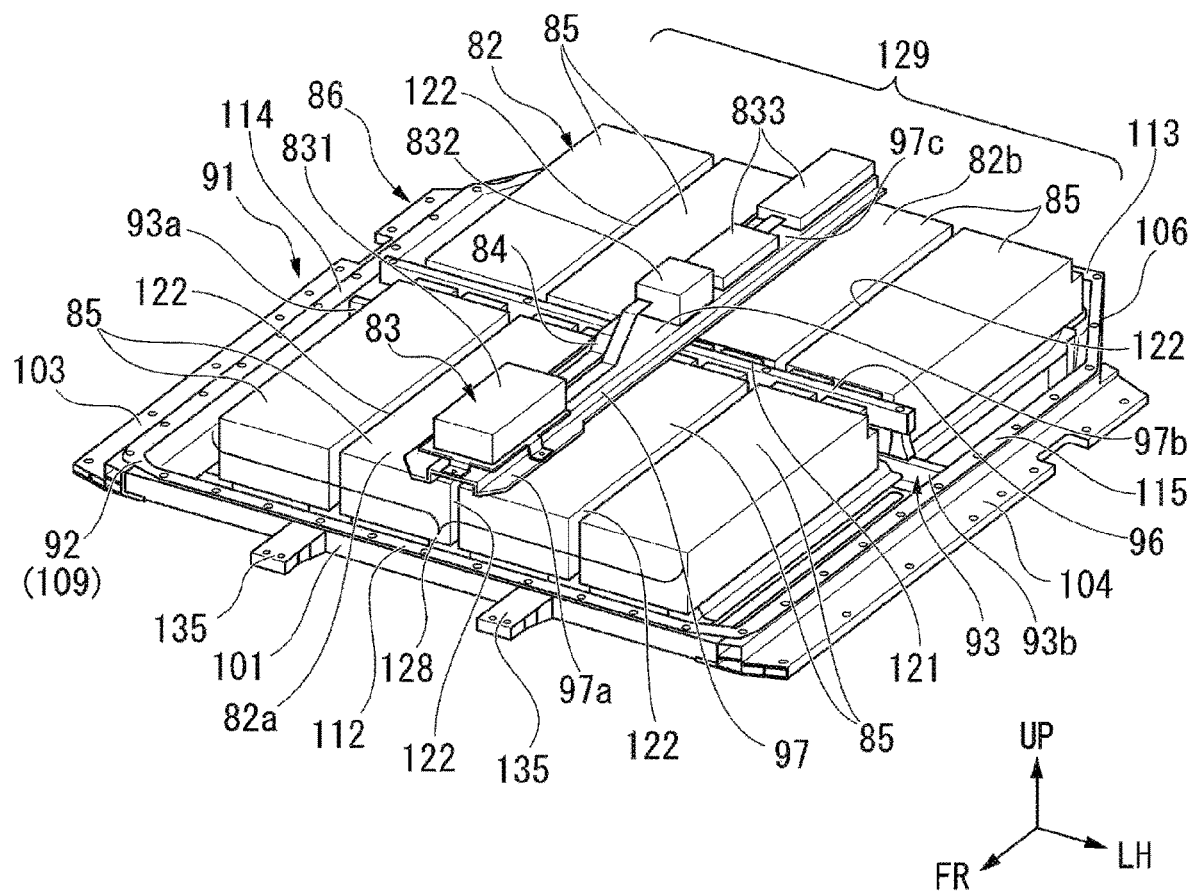

As shown in FIGS. 5 to 7, the battery pack 20 includes the battery case 81, the battery module 82, an auxiliary device unit 83, and an electrical wiring (high-voltage electric wire) 84.

(Battery Case)

The battery case 81 includes a case body 86 and a case cover 87. The case body 86 includes a case frame portion 91, a case portion (tray) 92, a lower cross member (tray cross member, a central portion in the front-rear direction of the vehicle body) 93, a first longitudinal frame 94 (see FIG. 3), a second longitudinal frame 95 (see FIG. 3), an upper cross member (tray cross member, a central portion in the front-rear direction of the vehicle body) 96, and an upper deck 97.

The case frame portion 91 includes a front frame (front portion) 101, a rear frame (rear portion) 102 (see also FIG. 3), a right frame (right side portion, side frame) 103, a left frame (left side portion, side frame) 104, a right inclined frame 105 (see FIG. 3), and a left inclined frame 106 (see FIG. 3).

The front frame 101 is arranged at a distance in the front of the vehicle body with respect to a front side edge of the battery module 82 and extends in the vehicle width direction. The rear frame 102 is arranged at a distance at the rear of the vehicle body with respect to a rear side edge of the battery module 82 and extends in the vehicle width direction.

The right frame 103 is arranged at a distance on the right side in the vehicle width direction with respect to a right side edge of the battery module 82, and extends from a right end portion of the front frame 101 toward the rear of the vehicle body. The right frame 103 and the rear frame 102 are connected by the right inclined frame 105.

The left frame 104 is arranged at a distance on the left side in the vehicle width direction with respect to a left side edge of the battery module 82, and extends from a left end portion of the front frame 101 toward the rear of the vehicle body. The left frame 104 and the rear frame 102 are connected by the left inclined frame 106.

As shown in FIGS. 3 and 7, the case frame portion 91 is formed in a substantially rectangular frame shape in a plan view by the front frame 101, the rear frame 102, the left frame 104, the right frame 103, the right inclined frame 105, and the left inclined frame 106. The case frame portion 91 is formed in a manner of covering an outer periphery of the battery module 82 at a distance.

The case frame portion 91 is attached to an outer periphery of the case portion 92. The case portion 92 is attached to the inside of the case frame portion 91 and is arranged below the battery module 82.

Specifically, the case portion 92 has a case bottom (a bottom (bottom wall) of the tray) 108 (see FIG. 4) and a case peripheral wall 109.

The case bottom 108 is arranged below the battery module 82 and is formed in a substantially rectangular shape in a plan view. The case bottom 108 forms a bottom of the battery case 81, and easily deformable portions 161 (see FIG. 4) are arranged on both outer sides of the case bottom 108 in the vehicle width direction. The easily deformable portion 161 is described later in detail.

The case peripheral wall 109 is formed along an outer periphery of the case bottom 108. The case peripheral wall 109 has a case front wall 112, a case rear wall 113, a case right wall 114, and a case left wall 115. The case portion 92 is provided with the lower cross member 93, a plurality of the first longitudinal frames 94 (see FIG. 3), and a plurality of the second longitudinal frames 95 (see FIG. 3).

The lower cross member 93 is arranged at the center of the case portion 92 (particularly, the case bottom 108) in the front-rear direction of the vehicle body, and is extended toward the vehicle width direction. That is, the lower cross member 93 is a member that constitutes a central portion in the front-rear direction of the vehicle body. For example, in the lower cross member 93, a right end portion 93a is in contact with the case right wall 114, and a left end portion 93b of the lower cross member 93 is in contact with the case left wall 115.

On the case bottom 108, a plurality of the first longitudinal frames 94 are arranged at intervals in the vehicle width direction in the vehicle body front of the lower cross member 93. On the case bottom 108, a plurality of the second longitudinal frames 95 are arranged at intervals in the vehicle width direction at the vehicle body rear of the lower cross member 93.

The plurality of first longitudinal frames 94 and the plurality of second longitudinal frames 95 are arranged in a manner of being spaced apart on the same line in the front-rear direction of the vehicle body. The lower cross member 93 is arranged between the plurality of first longitudinal frames 94 and the plurality of second longitudinal frames 95.

In the embodiment, one lower cross member 93 is illustrated, but the number of the lower cross member 93 can be selected as appropriate. In addition, in the embodiment, five first longitudinal frames 94 and five second longitudinal frames 95 are illustrated, but the number of the first longitudinal frame 94 and the number of the second longitudinal frame 95 can be selected as appropriate.

A battery 85 is arranged vertically between a pair of adjacent first longitudinal frames 94, and the vertically arranged battery 85 is supported by the pair of first longitudinal frames 94. The battery 85 is arranged vertically between a pair of adjacent second longitudinal frames 95, and the vertically arranged battery 85 is supported by the pair of second longitudinal frames 95. The battery 85 is formed into a longitudinally elongated rectangular body by stacking a plurality of battery cells (not shown) in a longitudinal direction. Hereinafter, the longitudinally elongated battery 85 may also be referred to as "longitudinal battery 85".

In addition, a vertical arrangement of the longitudinal battery 85 refers to an arrangement of the battery 85 with a longitudinal direction of the battery 85 directed toward the front-rear direction of the vehicle body (vertical direction).

In this way, on the case bottom 108 of the case portion 92, a plurality of the first longitudinal frames 94 and a plurality of the second longitudinal frames 95 are arranged at internals in the front-rear direction of the vehicle body and are directed toward the front-rear direction of the vehicle body. Furthermore, the lower cross member 93 is arranged between the plurality of first longitudinal frames 94 and the plurality of second longitudinal frames 95.

Thus, in case regions in the vehicle body front and at the vehicle body rear of the lower cross member 93, the plurality of longitudinal batteries 85 can be arranged vertically toward the front-rear direction of the vehicle body along the plurality of first longitudinal frames 94 and the plurality of second longitudinal frames 95. Accordingly, the plurality of longitudinal batteries 85 can be arranged vertically in an efficient manner, and a sufficient cruising range can thus be secured.

(Battery Module)

In the vehicle body front of the lower cross member 93, a plurality of front batteries 85 are supported vertically by the plurality of first longitudinal frames 94. At the vehicle body rear of the lower cross member 93, a plurality of rear batteries 85 are supported vertically by the plurality of second longitudinal frames 95. A first battery row 128 is constituted by the plurality of batteries 85 arranged on the front side, and a second battery row 129 is constituted by the plurality of batteries 85 arranged on the rear side.

A pair of the first battery row 128 and the second battery row 129 is arranged in the front-rear direction of the vehicle body. The first battery row 128 and the second battery row 129 constitute, for example, the battery module 82 for driving.

That is, the battery module 82 is supported by the plurality of first longitudinal frames 94 and the plurality of second longitudinal frames 95 in a state that the plurality of batteries 85 are vertically arranged with the longitudinal direction of the battery directed toward the front-rear direction of the vehicle body.

In the embodiment, an example in which a pair of the first battery row 128 and the second battery row 129 is arranged in the front-rear direction of the vehicle body has been described, but the disclosure is not limited thereto. As another example, the first battery row 128 and the second battery row 129 may be arranged in three or more rows in the front-rear direction of the vehicle body.

The battery module 82 has a first boundary portion 121 that is formed between the first battery row 128 and the second battery row 129 and extends in the vehicle width direction, and a second boundary portion 122 that extends in the front-rear direction of the vehicle body among the plurality of batteries 85. The first boundary portion 121 extends in the vehicle width direction along the lower cross member 93. The second boundary portion 122 extends in the front-rear direction of the vehicle body along the first longitudinal frame 94 and the second longitudinal frame 95.

The upper cross member 96 is arranged above the battery module 82 at a position corresponding to the first boundary portion 121.

Figure 8:
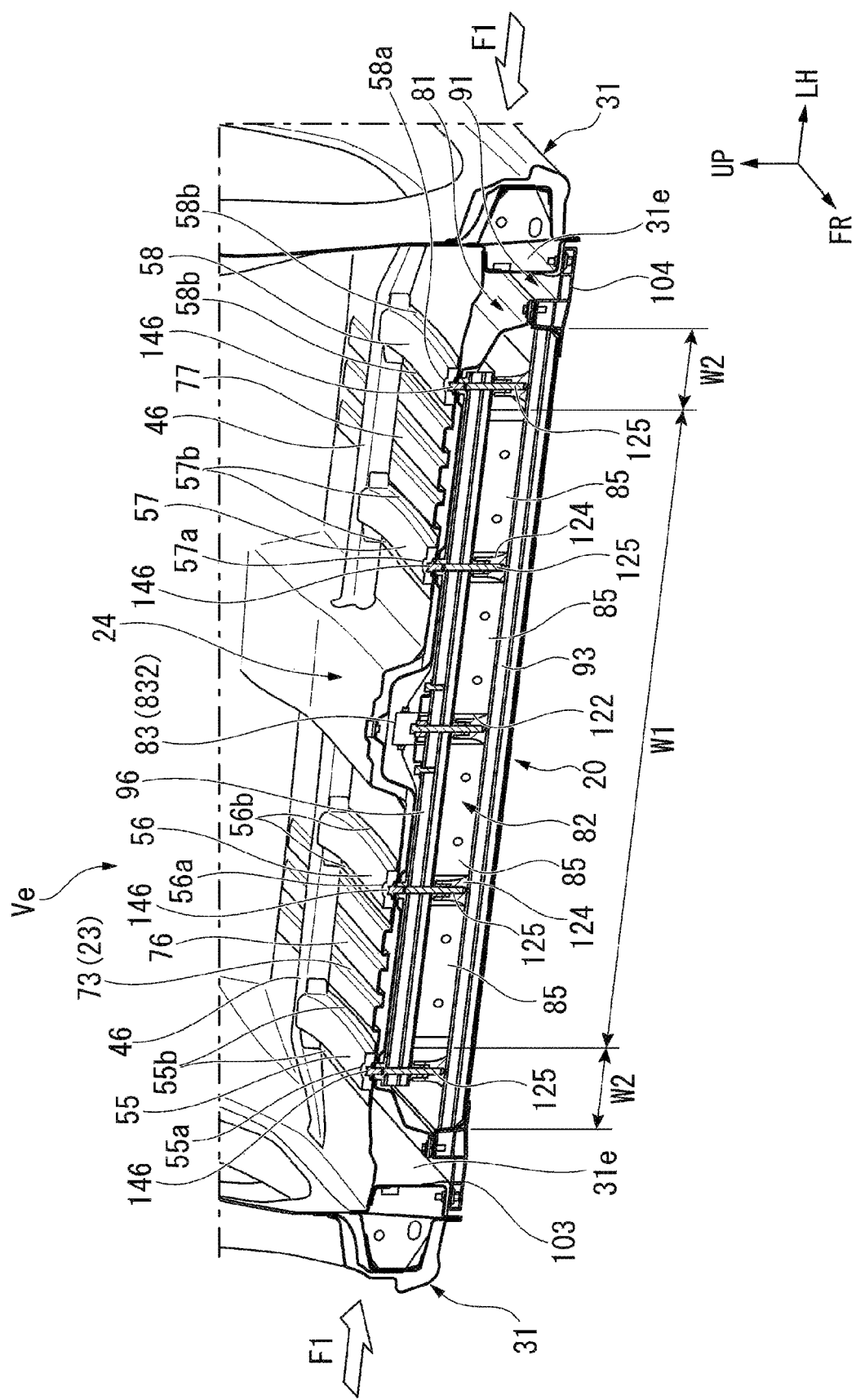
FIG. 8 is a perspective view in which the vehicle equipped with a battery pack according to an embodiment is fractured at a first boundary portion of the battery pack.
Figure 9:
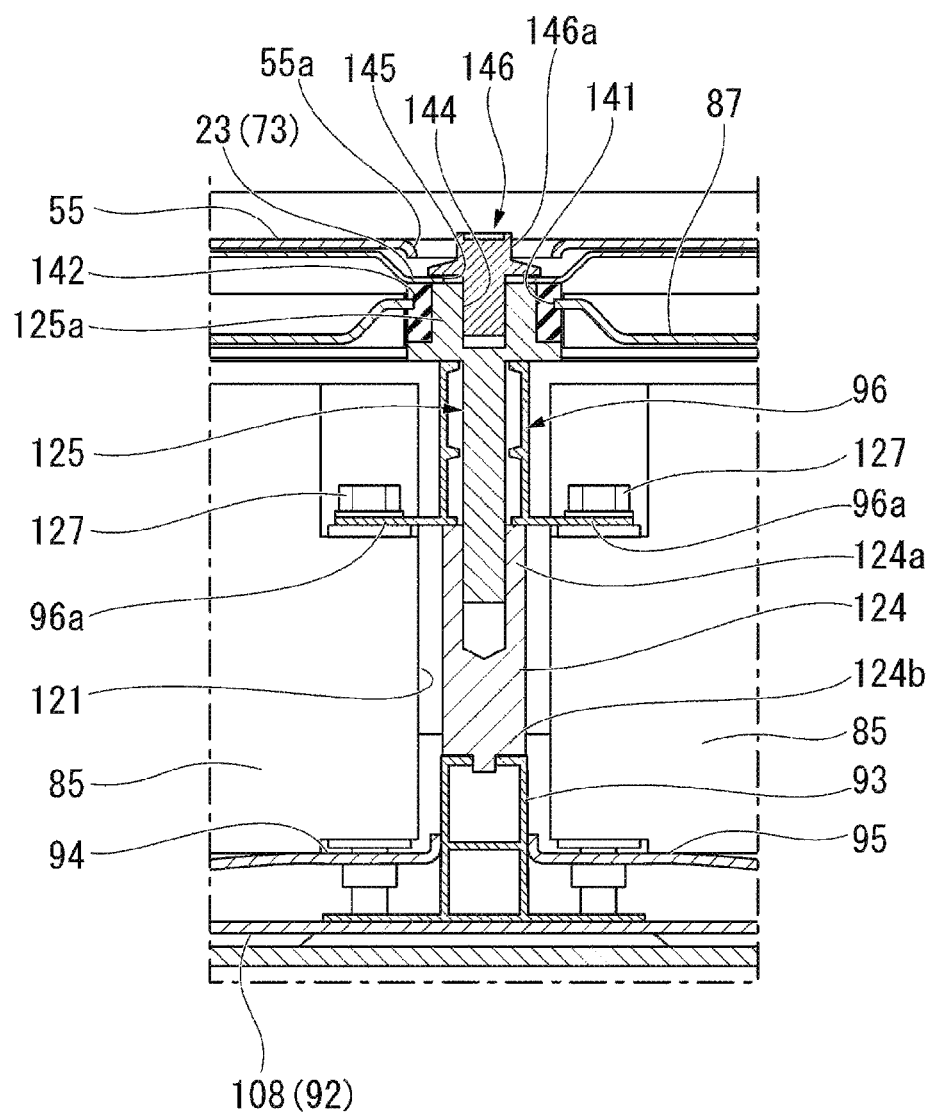
FIG. 9 is a cross-sectional view in which the vehicle equipped with a battery pack in FIG. 2 is fractured at line IX-IX.

As shown in FIGS. 7 to 9, the upper cross member 96 is arranged along the lower cross member 93. The upper cross member 96 is coupled to an upper end portion 124*a* of an upper and lower connecting collar 124 by a fastening bolt 125. A lower end portion 124*b* of the upper and lower connecting collar 124 is connected to the lower cross member 93. Thus, the upper cross member 96 is coupled to the lower cross member 93 via the fastening bolt 125 and the upper and lower connecting collar 124.

In this state, a flange 96*a* of the upper cross member 96 is coupled to the battery 85 by a fastening bolt 127. Thereby, the plurality of batteries 85 are fixed by the upper cross member 96 from above. Specifically, the upper cross member 96 connects the plurality of batteries 85 arranged in the front-rear direction of the vehicle body and also connects the plurality of batteries 85 arranged in the vehicle width direction at the center of the battery module 82 in the front-rear direction of the vehicle body.

In addition, the plurality of batteries 85 arranged in the vehicle width direction are connected at a front end portion 82*a* of the battery module 82 by a front connecting bracket (not shown). Furthermore, the plurality of batteries 85 arranged in the vehicle width direction are connected to a rear end portion 82*b* of the battery module 82 by a rear connecting bracket (not shown).

In this way, the plurality of batteries 85 are placed on the plurality of first longitudinal frames 94 and the plurality of second longitudinal frames 95. Furthermore, the plurality of batteries 85 (that is, the battery modules 82) are fixed by the upper cross member 96 from above. Specifically, in the front-rear direction of the vehicle body and the vehicle width direction, the plurality of batteries 85 are connected at the central portion of the battery module 82 in the front-rear direction of the vehicle body by the upper cross member 96 from above. In addition, the front end portion 82*a* of the battery module 82 is connected by the front connecting bracket in the vehicle width direction. Furthermore, the rear end portion 82*b* of the battery module 82 is connected by the rear connecting bracket in the vehicle width direction.

Thereby, the plurality of longitudinal batteries 85 (that is, the battery module 82) can be fixed stably and can be connected as a single unit while securing the rigidity of the battery module 82.

(Auxiliary Device Unit)

As shown in FIGS. 5 and 7, the upper deck 97 is arranged above the battery module 82 and at the second boundary 122 in the center in the vehicle width direction among the plurality of second boundaries 122. The upper deck 97 is formed in a band shape and extends from the front end portion 82*a* to the rear end portion 82*b* of the battery module 82 in the front-rear direction of the vehicle body. The upper deck 97 is equipped with the auxiliary device unit 83. The auxiliary device unit 83 includes a first battery auxiliary device 831, a second battery auxiliary device 832, and a third battery auxiliary device 833.

The first battery auxiliary device 831 is, for example, a high-voltage junction board. The high-voltage junction board is, for example, an auxiliary device that supplies electricity of the battery module 82 for driving to a drive motor (not shown).

The second battery auxiliary device 832 is, for example, a cutoff switch. The cutoff switch is, for example, a switch that cuts off power supply of the battery module 82.

The third battery auxiliary device 833 is, for example, an electronic control unit (ECU, control device) or the like. The ECU is, for example, a battery management unit that controls discharge and charge between the battery module 82 for driving and the drive motor.

The first battery auxiliary device 831 is arranged in a state of being placed on a front portion 97a of the upper deck 97. The second battery auxiliary device 832 is arranged in a state of being placed on a central portion 97b of the upper deck 97 at the vehicle body rear of the first battery auxiliary device 831. The third battery auxiliary device 833 is arranged in a state of being placed on a rear portion 97c of the upper deck 97 at the vehicle body rear of the second battery auxiliary device 832.

The first battery auxiliary device 831 is formed higher upward from a surface of the upper deck 97 as compared with the second battery auxiliary device 832 and the third battery auxiliary device 833.

Hereinafter, the first battery auxiliary device 831 may also be referred to as "tall first battery auxiliary device 831". In addition, the second battery auxiliary device 832 and the third battery auxiliary device 833 may also be referred to as "short second battery auxiliary device 832" and "short third battery auxiliary device 833", respectively.

As shown in FIGS. 7 and 8, the auxiliary device unit 83 is arranged above the battery module 82 in the center in the vehicle width direction and between the plurality of batteries 85 (that is, the second boundary portion 122 in the center in the vehicle width direction). Thus, a width dimension W1 of the battery module 82 in the vehicle width direction can be kept small without impairing a capacity of the battery module 82. Thereby, for example, a large collision stroke space (deformation allowable space) W2 that allows deformation caused by the side collision load F1 input by a side collision can be set.

(Electrical Wiring)

As shown in FIGS. 5 and 7, the electrical wiring 84 is arranged in a space of the first boundary portion 121 of the battery module 82 and a space of the second boundary portion 122 in the center in the vehicle width direction. The electrical wiring 84 connects the plurality of batteries 85, the first battery auxiliary device 831, the second battery auxiliary device 832, the third battery auxiliary device 833, and the like.

That is, in the electrical wiring 84, battery terminals of the first battery row 128 and a plurality of battery terminals of the second battery row 129 are horizontally wired (routed) in the vehicle width direction in the space of the first boundary portion 121 along the lower cross member 93. In addition, the horizontally wired electrical wiring 84 is vertically wired (routed) in the front-rear direction of the vehicle body in a state of being bundled along an upper surface of the upper deck 97, and is connected to the drive motor (not shown) side.

Here, the load F1 input by a side collision can be supported by the lower cross member 93 and the upper cross member 96. Thereby, the electrical wiring 84 horizontally wired along the lower cross member 93 in the vehicle width direction can be protected from the load F1 by the lower cross member 93 and the upper cross member 96. In addition, the electrical wiring 84 vertically wired to the drive motor side in a state of being bundled along the upper surface of the upper deck 97 is arranged at a position relatively distant from the load F1 input by a side collision in the vehicle width direction. Thereby, the vertically wired electrical wiring 84 can be protected from the load F1.

The case cover 87 is attached to the case frame portion 91 from above in a state that the battery module 82, the auxiliary device unit 83, and the electrical wiring 84 are accommodated in the case body 86.

In the case cover 87, a raised portion 89 extends in the front-rear direction of the vehicle body along the upper deck 97 at the center in the vehicle width direction. The raised portion 89 is formed to be uneven in the up-down direction corresponding to the auxiliary device unit 83 (that is, the first battery auxiliary device 831, the second battery auxiliary device 832, and the third battery auxiliary device 833) and the electrical wiring 84. The upper deck 97, the auxiliary device unit 83, and the electrical wiring 84 are accommodated in the raised portion 89 from below. The battery pack 20 is assembled in this state and is attached under the floor of the vehicle Ve.

(Assembly of Battery Pack Under Floor of Vehicle)

As shown in FIGS. 3 and 8, the right frame 103 of the battery case 81 is fixed to an inner panel 31e of the right side sill 31 from below. The left frame 104 of the battery case 81 is fixed to an inner panel 31e of the left side sill 31 from below.

The front frame 101 of the battery case 81 is fixed to a pair of inner extension portions 39 (that is, a pair of front side frames 36) (see FIG. 3) via a pair of front support brackets 135 (see also FIG. 7).

The rear frame 102 of the battery case 81 is fixed to a rear cross member 138 via a pair of rear support brackets 136. The rear cross member 138 is a highly rigid member that is arranged at the rear of the battery pack 20 in the vehicle body so as to extend in the vehicle width direction, and constitutes a part of the framework of the vehicle body 10. Furthermore, the rear frame 102 of the battery case 81 is fixed to the fourth floor cross member 47 (see FIG. 2).

As shown in FIGS. 3, 8 and 9, a head 125a of the fastening bolt 125 penetrates a through hole 141 of the case cover 87 and is in contact with the floor panel 23 (specifically, the main floor portion 73) on the upper side. In addition, a rubber member 142 arranged on the head 125a also penetrates the through hole 141 of the case cover 87 and is in contact with the floor panel 23 on the upper side.

A female screw 144 of the head 125a is arranged downward to fit to a mounting hole 145 of the floor panel 23. A fastening bolt 146 is screwed to the female screw 144 of the head 125a through the mounting hole 145 of the floor panel 23.

Thus, the upper cross member 96 and the lower cross member 93 of the battery pack 20 are attached to the floor panel 23 via the fastening bolt 146, the fastening bolt 125, and the upper and lower connecting collar 124.

A head 146a of the fastening bolt 146 protrudes upward from, for example, through holes 55a to 58a at the top of the first to fourth floor longitudinal frames 55 to 58. Alternatively, the head 146a of the fastening bolt 146 is arranged at, for example, a position corresponding to the through holes 55a to 58a of the first to fourth floor longitudinal frames 55 to 58.

Here, in the first to fourth floor longitudinal frames 55 to 58, left and right flanges 55b to 58b are joined to the floor panel 23 (specifically, the main floor portion 73). Thus, the upper cross member 96 and the lower cross member 93 of the battery pack 20 are vertically fixed to the first to fourth floor longitudinal frames 55 to 58 via the floor panel 23.

In addition, the upper cross member 96 and the lower cross member 93 form a central portion of the battery case 81 in the front-rear direction of the vehicle body. Thus, the central portion of the battery case 81 in the front-rear direction of the vehicle body is vertically fixed to the first to fourth floor longitudinal frames 55 to 58.

The first to fourth floor longitudinal frames 55 to 58 are frames extending in the front-rear direction of the vehicle body. Thus, the degree of freedom in layout of the upper cross member 96 and the lower cross member 93 (that is, the battery pack 20) can be increased in the front-rear direction of the vehicle body. Thereby, the upper cross member 96 and the lower cross member 93 can be arranged at a position where the batteries 85 can be evenly arranged in the vehicle body front and at the vehicle body rear of each of the cross members 96 and 93 and a position where the first to fourth floor longitudinal frames 55 to 58 can be fixed.

In this way, by evenly arranging the batteries 85 in the vehicle body front and at the vehicle body rear of the upper cross member 96 and the lower cross member 93, the battery case 81 (that is, the battery pack 20) can be miniaturized.

In addition, in the battery case 81, an outer frame (that is, the case frame portion 91) of the battery case 81 is formed by the front frame 101, the rear frame 102, the right frame 103, the left frame 104, and the like. Thus, in the battery case 81, the case frame portion 91 is fixed to the right and left side sills 31 and 31, the pair of the inner extension portions 39 (the pair of the front side frames 36), the rear cross member 138, and the fourth floor cross member 47.

Furthermore, the central portion of the battery case 81 in the front-rear direction of the vehicle body (that is, the upper cross member 96 and the lower cross member 93) is fixed to the first to fourth floor longitudinal frames 55 to 58.

Thereby, a large accommodation space for the battery module 82 can be secured inside the battery case 81 to maximize the battery capacity of the battery pack 20, and furthermore the battery case 81 (that is, the battery pack 20) can be stably fixed under the floor panel 23.

Furthermore, the central portion of the battery pack 20 in the front-rear direction of the vehicle body (that is, the upper cross member 96 and the lower cross member 93) is fixed to the first to fourth floor longitudinal frames 55 to 58. The first to fourth floor longitudinal frames 55 to 58 are frames extending in the front-rear direction of the vehicle body. Thus, when the layout of the battery pack 20 is decided, for example, the battery pack 20 can be moved in the front-rear direction of the vehicle body to some extent. That is, a center of gravity of pack Gi of the battery pack 20 can be arranged at the rear of a center of gravity of vehicle Gb of the entire vehicle in the vehicle body. The center of gravity of vehicle Gb of the entire vehicle is a center of gravity including all of the vehicle body 10, the motor (not shown), the battery pack 20, and the like. By arranging the center of gravity of pack Gi of the battery pack 20 at the rear of the center of gravity of vehicle Gb of the entire vehicle in the vehicle body, for example, a rotational moment M1 applied on the battery module 82 can be set small, the rotational moment M1 being caused by the side collision load F1 input to a side portion of the vehicle Ve. Thereby, the impact on the battery pack 20 caused by a side collision can be mitigated.

In this state, the battery pack 20 is assembled under the floor of the vehicle Ye. Furthermore, the plurality of batteries 85 of the battery module 82 accommodated in the battery pack 20 are arranged in a state of being vertically arranged with the longitudinal direction of the battery directed toward the front-rear direction of the vehicle body (see FIGS. 5 and 7).

In addition, as shown in FIGS. 5 to 7, the raised portion 89 of the case cover 87, the auxiliary device unit 83 (the first battery auxiliary device 831, the second battery auxiliary device 832, and the third battery auxiliary device 833), and the electrical wiring 84 are accommodated inside the floor tunnel 24 of the vehicle Ve.

Specifically, the first battery auxiliary device 831 is accommodated (arranged) inside the front tunnel portion 241 from below. The second battery auxiliary device 832 and the third battery auxiliary device 833 are accommodated (arranged) inside the rear tunnel portion 243 from below. The electrical wiring 84 is accommodated inside the central tunnel portion 242 from below. Inside the central tunnel portion 242, the electrical wiring 84 extends in the front-rear direction of the vehicle body across the right second floor cross member 45 and the left second floor cross member 45.

In this way, the first battery auxiliary device 831 is arranged inside the front tunnel portion 241 from below, and the second battery auxiliary device 832 and the third battery auxiliary device 833 are arranged inside the rear tunnel portion 243 from below. Thus, the first battery auxiliary device 831, the second battery auxiliary device 832, and the third battery auxiliary device 833 (that is, the auxiliary device unit 83) can be arranged above the battery module 82. Thereby, for example, it is not necessary to arrange the auxiliary device unit 83 around the battery module 82, and a capacity of the battery 85 can be sufficiently secured in a state that the battery pack 20 is miniaturized.

In addition, the first battery auxiliary device 831, the second battery auxiliary device 832, and the third battery auxiliary device 833 are separately arranged inside the front tunnel portion 241 and inside the rear tunnel portion 243. Furthermore, the separated first battery auxiliary device 831, second battery auxiliary device 832, and third battery auxiliary device 833 are connected by the electrical wiring 84.

Here, the front tunnel portion 241 and the rear tunnel portion 243 are formed separately in the front-rear direction of the vehicle body of the right second floor cross member 45 and the left second floor cross member 45. That is, in the front-rear direction of the vehicle body, the electrical wiring 84 can be arranged at a position straddling the right second floor cross member 45 and the left second floor cross member 45. In addition, the first battery auxiliary device 831, the second battery auxiliary device 832, and the third battery auxiliary device 833 can be arranged apart from the right second floor cross member 45 and the left second floor cross member 45.

Thus, in the floor tunnel 24, only portions corresponding to the right and left second floor cross members 45 and 45 (that is, the central tunnel portion 242) can be suppressed lower than the other portions (that is, the front tunnel portion 241, the rear tunnel portion 243, and the like). Thereby, as described above, the right second floor cross member 45 and the left second floor cross member 45 are formed in a state of being integrally continuous in the vehicle width direction via the top portion 242a of the central tunnel portion 242.

Thus, the rigidity and strength of the right second floor cross member 45 and the left second floor cross member 45 can be secured against the side collision load F1 input from the side portion of the vehicle Ve by a side collision. Thereby, the battery module 82 (that is, a plurality of batteries 85), the first battery auxiliary device 831, the second battery auxiliary device 832, the third battery auxiliary device 833, and the like can be protected from the load F1 caused by a side collision.

Furthermore, the first battery auxiliary device 831 is formed higher upward than the second battery auxiliary device 832 and the third battery auxiliary device 833. The tall first battery auxiliary device 831 may be, for example, a high-voltage junction board as described above, and the short second battery auxiliary device 832 may be, for example, a cutoff switch as described above. In addition, the short third battery auxiliary device 833 may be, for example, an ECU as described above.

The tall first battery auxiliary device 831 is arranged inside the front tunnel portion 241. Here, for example, by accommodating the front tunnel portion 241 inside a center console (not shown) between the right front seat FS1 and the left front seat FS2, the tall first battery auxiliary device 831 can be accommodated inside the center console.

In addition, the short second battery auxiliary device 832 and the short third battery auxiliary device 833 are arranged inside the rear tunnel portion 243. Thus, a height of the rear tunnel portion 243 can be kept low. The rear tunnel portion 243 extends from the vehicle body rear of the right front seat FS1 and the left front seat FS2 to (below) a central portion of the rear seat RS in the vehicle width direction. Thereby, by keeping a low height of the rear tunnel portion 243, a large space in the vehicle body front of the rear seat RS can be secured.

In this way, by separately arranging the tall first battery auxiliary device 831, the short second battery auxiliary device 832, and the short third battery auxiliary device 833 inside the floor tunnel 24 in the front-rear direction of the vehicle body, the interior space 75 of the vehicle Ve (see FIG. 1) can be widened.

As described above, according to the vehicle Ve equipped with a battery pack according to the embodiment, the following operations and effects can be obtained.

That is, by vertically fixing the central portion of the battery case 81 in the front-rear direction of the vehicle body to the first to fourth floor longitudinal frames 55 to 58, the degree of freedom in arranging (laying out) component parts such as the battery 85 of the battery pack 20 and the like can be improved in the front-rear direction of the vehicle body.

Particularly, by improving the degree of freedom in arranging component parts such as the battery 85 of the battery pack 20 and the like in the front-rear direction of the vehicle body, for example, a maximum amplitude position of a bent portion in the up-down direction (a direction of an arrow A shown in FIG. 6) generated in the battery case 81 when the vehicle Ve is running can be fixed to the vehicle body 10.

For example, by setting the maximum amplitude position of the battery case 81 as the central portion in the front-rear direction of the vehicle body, and fixing the upper cross member 96 and the lower cross member 93 to the first to fourth floor longitudinal frames 55 to 58, an amplitude of the battery case 81 can be suppressed.

In addition, the first to fourth floor longitudinal frames 55 to 58 are arranged between the right and left front seats FS1 and FS2 and the rear seat RS in the front-rear direction of the vehicle body. Thus, for example, the fastening bolt 146 and the like for fixing the battery case 81 of the battery pack 20 to the first to fourth floor longitudinal frames 55 to 58 can be arranged in a space on the indoor side between the right and left front seats FS1 and FS2 and the rear seat RS. Thereby, an access of a tool to the fastening bolt 146 for fastening the battery pack 20 to the vehicle body 10 can be facilitated.

Furthermore, by arranging the fastening bolt 146 and the like between the front and rear seats, when the battery pack 20 is attached or detached, for example, there is no need to slid (move) the right front seat FS1 and the left front seat FS2 in the front-rear direction of the vehicle body or remove the right front seat FS1, the left front seat FS2, and the rear seat RS.

Thus, for example, when the battery pack 20 is assembled, the work time can be shortened due to reduction in restrictions on the assembly order and furthermore the reduction in the work processes. Thereby, for example, the detachability of the battery pack 20 can be improved, and the maintenance (maintenance and inspection) cost can be kept low.

Particularly, the second battery auxiliary device 832 is arranged at a portion 243a on the vehicle body front side in the rear tunnel portion 243 of the floor tunnel 24. The portion 243a on the vehicle body front side of the rear tunnel portion 243 is arranged in, for example, the space between the right and left front seats FS1 and FS2 and the rear seat RS in the front-rear direction of the vehicle body. Thus, the second battery auxiliary device 832 is used as a cutoff switch and is accommodated in the portion 243a on the vehicle body front side of the rear tunnel portion 243. Thereby, the second battery auxiliary device 832 (that is, the cutoff switch) can be arranged in the space between the right and left front seats FS1 and FS2 and the rear seat RS. Accordingly, for example, because the cutoff switch can be operated without sliding (moving) or removing the right front seat FS1, the left front seat FS2, and the rear seat RS, maintenance work (maintenance and inspection work) of the battery pack 20 can be facilitated.

As shown in FIGS. 2, 3, and 8, the battery case 81 of the battery pack 20 is arranged inside a rectangular frame body in a plan view formed by the first floor cross member 44, the fourth floor cross member 47, the right side sill 31, and the left side sill 31.

Here, the first to fourth floor cross members 44 to 47, the right and left side sills 31 and 31, the right and left front side frames 36 and 36, and the floor tunnel 24 are highly rigid members that constitute a part of the framework of the vehicle body. In addition, the front portion (front leg) of the right and left front seats FS1 and FS2 on which the first floor cross member 44 is supported are also highly rigid members.

Thus, the battery case 81 can be arranged inside the rectangular frame body that forms a part of the framework of the vehicle body. Thereby, the battery case 81 (particularly, the battery module 82) can be protected from, for example, a front collision load (load) caused by a frontal collision or a side collision load (load) caused by a side collision.

Specifically, for example, when the side collision load F1 is input to the right and left side sills 31 and 31 by a side collision, the side collision load F1 is transmitted to the first to fourth floor cross members 44 to 47 via the side sill 31, and is supported by the first to fourth floor cross members 44 to 47. Thereby, the battery case 81 (particularly, the battery module 82) can be protected from the side collision load F1.

In addition, when a front collision load F2 is input to the right and left front side frames 36 and 36 from the front of the vehicle body due to a frontal collision, a part of the front collision load F2 is transmitted to the outer extension portion 38 of the front side frame 36. The load transmitted to the outer extension portion 38 is transmitted to the front portion 31a of the side sill 31 via the outer extension portion 38. The load transmitted to the front portion 31a of the side sill 31 is supported by the side sill 31.

In addition, the rest of the front collision load F2 is transmitted to the central portion of the first floor cross member 44 via the inner extension portion 39 of the front side frame 36. The front portion (front leg) of the right and left front seats FS1 and FS2 and the floor tunnel 24 are connected (joined) to the first floor cross member 44. Thus, the load transmitted to the central portion of the first floor cross member 44 is supported by the front portion of the right and left front seats FS1 and FS2 and the floor tunnel 24. Thereby, the battery case 81 (particularly, the battery module 82) can be protected from the front collision load F2.

Figure 10:
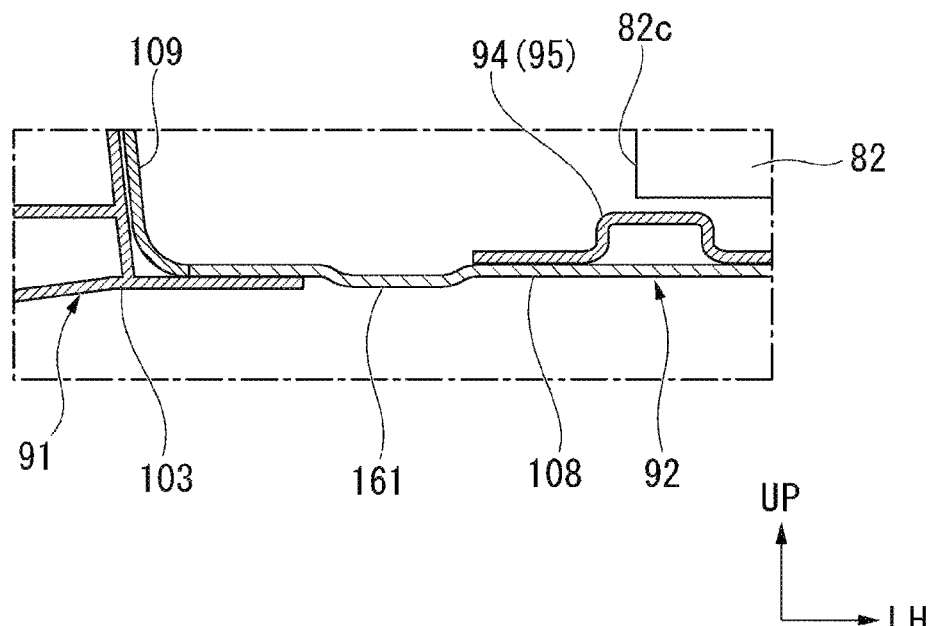
FIG. 10 is an enlarged cross-sectional view of portion X in FIG. 4.

As shown in FIGS. 4 and 10, the first longitudinal frame 94 on the right outer side and the second longitudinal frame 95 on the right outer side (see also FIG. 3) are arranged to extend toward the front-back direction of the vehicle body at a right outer end portion 82c of the battery module 82 in the vehicle width direction. The first longitudinal frame 94 on the right outer side and the second longitudinal frame 95 on the right outer side support the right outer end portion 82c of the battery module 82 in the vehicle width direction.

On the case bottom 108 of the battery case 81, the easily deformable portion (tray deforming portion) 161 is arranged further outward in the vehicle width direction than the first longitudinal frame 94 on the right outer side and the second longitudinal frame 95 on the right outer side.

Specifically, the easily deformable portion 161 is arranged between the right side frame 103 and the battery module 82.

The easily deformable portion 161 is formed in a bead shape in a manner of protruding downward, and extends in the front-rear direction of the vehicle body. The easily deformable portion 161 is formed to be deformed by the side collision load F1 of a side collision so as to be capable of absorbing a side collision energy (impact energy).

Figure 11:
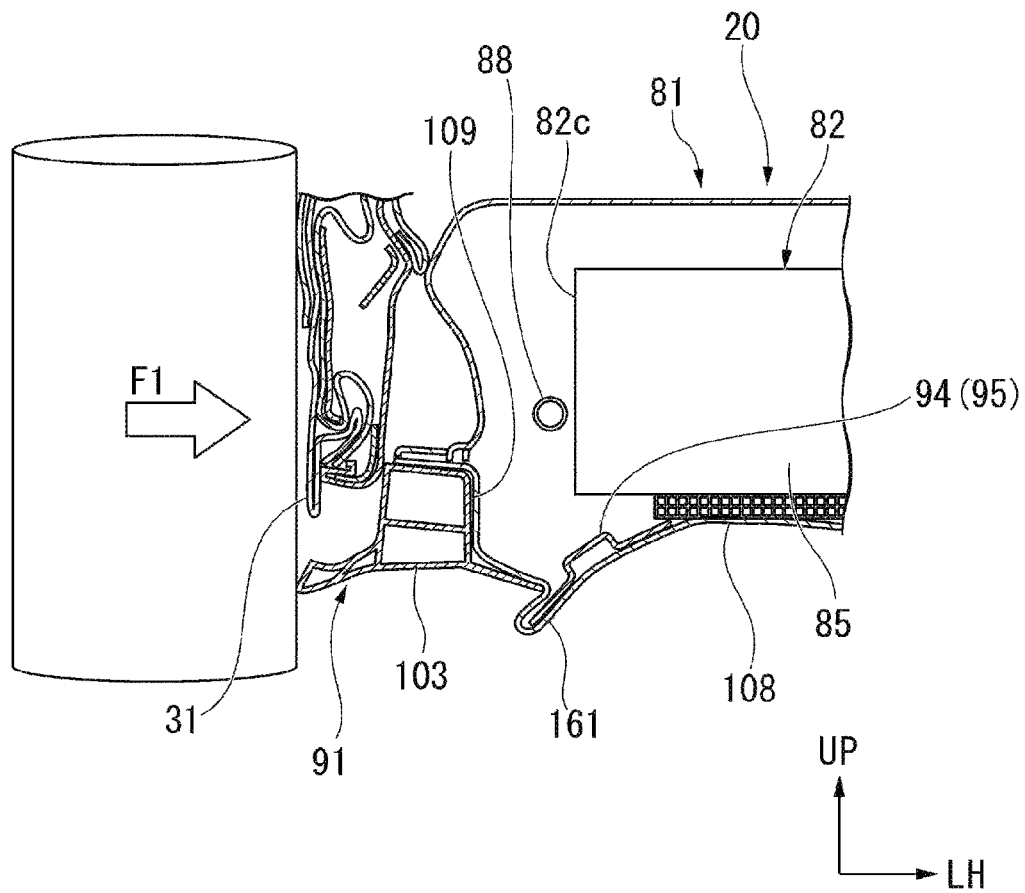
FIG. 11 is a cross-sectional view illustrating an example of deforming an easily deformable portion of the battery pack according to an embodiment.

Thus, as shown in FIG. 11, the easily deformable portion 161 can be deformed by the side collision load F1 input by a side collision, and the side collision energy can be absorbed by the easily deformable portion 161. Thereby, interference with the battery module 82 caused by the load F1 of a side collision can be reduced.

Furthermore, for example, it is possible to eliminate the need for reinforcement of a vehicle body frame (framework member) such as the right side sill 31 arranged on the outer side of the vehicle body 10 in the vehicle width direction. Thereby, a yield strength of the vehicle body can be kept low and the weight of the vehicle body can be reduced.

Here, as shown in FIGS. 10 and 11, the easily deformable portion 161 is formed in a bead shape in a manner of protruding downward. Thus, the easily deformable portion 161 can be deformed downward. Thereby, for example, interference of the easily deformable portion 161 with the battery module 82 (that is, the plurality of batteries 85) accommodated inside the battery case 81 of the battery pack 20, the water cooling pipe 88, or the like can be avoided.

In addition, as shown in FIG. 8, on the case bottom 108 of the battery case 81, an easily deformable portion (not shown) is arranged between the left frame 104 and the battery module 82. Thus, the easily deformable portion can be deformed downward by the side collision load F1 input by a side collision. Thereby, the side collision energy can be absorbed by the easily deformable portion, which can eliminate the need for reinforcement of the vehicle body frame (framework member) such as the left side sill 31 or the like, and reduce the weight of the vehicle body frame. Furthermore, by deforming the easily deformable portion downward, the interference of the easily deformable portion 161 with the battery module 82 (that is, the plurality of batteries 85), the water cooling pipe 88 (see FIG. 4), or the like can be avoided.

Additionally, as described in FIGS. 2 and 4, by arranging the inclined member 48 below the right end portion 45a of the right second floor cross member 45, the inclined closed cross section 49 is formed larger than the cross member inclined closed cross section 43. Therefore, for example, the inclined member 48 can be deformed in a manner of being bent downward with respect to the right second floor cross member 45 under the side collision load F1 input by a side collision. Accordingly, the side collision energy generated by the side collision can be absorbed by the inclined member 48.

Similar to the right second floor cross member 45, each of the left second floor cross member 45, the right third floor cross member 46, and the left third floor cross member 46 is also provided with an inclined member 48 below. Therefore, for example, the inclined member 48 can be deformed in a manner of being bent downward with respect to the left second floor cross member 45, the right third floor cross member 46, and the left third floor cross member 46 under the side collision load F1 input by a side collision. Accordingly, the side collision energy generated by the side collision can be absorbed by the inclined member 48.

It should be noted that the technical scope of the disclosure is not limited to the above embodiment, and various modifications can be made without departing from the spirit of the disclosure.

In addition, it is possible to replace component elements in the above embodiment with well-known component elements as appropriate without departing from the spirit of the disclosure, and the modifications described above may be appropriately combined.

What is claimed is:

1. A vehicle equipped with a battery pack, comprising:
a second floor cross member that is raised upward from a floor panel forming a floor portion of the vehicle and extends in a vehicle width direction to support a rear portion of a front seat;
a third floor cross member that extends in the vehicle width direction along the second floor cross member at a vehicle body rear of the second floor cross member and is raised upward from the floor panel to support a front portion of a rear seat;
a floor longitudinal frame that extends in a front-rear direction of a vehicle body between the second floor cross member and the third floor cross member;
a battery pack which is arranged under a floor of the floor longitudinal frame and the floor panel, and in which a battery case for accommodating a battery module is vertically fixed to the floor longitudinal frame;
a first floor cross member that extends in the vehicle width direction along the second floor cross member in a vehicle body front of the second floor cross member and supports a front portion of the front seat;
a fourth floor cross member that extends in the vehicle width direction along the third floor cross member at the vehicle body rear of the third floor cross member;
a side sill that is joined to the first floor cross member, the second floor cross member, the third floor cross member, and the fourth floor cross member from an outer side in the vehicle width direction and extends in the front-rear direction of the vehicle body;
a floor tunnel that connects the first floor cross member and the fourth floor cross member in the front-rear direction of the vehicle body and is raised upward from the floor panel to divide the second floor cross member and the third floor cross member into left and right sides in the vehicle width direction; and
a front side frame that extends from the first floor cross member toward a front of the vehicle body;
wherein the front side frame comprises:
a front frame portion that extends in the front-rear direction of the vehicle body:
an outer extension portion that extends outward in an inclined manner in the vehicle width direction from a rear end portion of the front frame portion toward a rear of the vehicle body, and is joined to a front portion of the side sill; and
an inner extension portion that extends inward in an inclined manner in the vehicle width direction from the rear end portion of the front frame portion toward the rear of the vehicle body, and is joined to the first floor cross member,
the front frame portion, the outer extension portion, and the inner extension portion form a Y-shaped frame in a plan view, and
the battery case is arranged inside a rectangular frame body in a plan view formed by the first floor cross member, the fourth floor cross member, and the side sill.

2. The vehicle equipped with a battery pack according to claim 1, wherein
the floor panel forms an accommodation space for accommodating the battery case below a floor portion raised upward at the vehicle body rear of a footrest of an occupant seated in the front seat.

3. The vehicle equipped with a battery pack according to claim 1, wherein
the floor panel forms an accommodation space for accommodating the battery case below a floor portion raised upward at the vehicle body rear of a footrest of an occupant seated in the front seat.

4. The vehicle equipped with a battery pack according to claim 1, wherein
the battery case comprises a tray cross member that is vertically fixed to the floor longitudinal frame.

5. The vehicle equipped with a battery pack according to claim 1, wherein
the battery case comprises a tray cross member that is vertically fixed to the floor longitudinal frame.

6. The vehicle equipped with a battery pack according to claim 2, wherein
the battery case comprises a tray cross member that is vertically fixed to the floor longitudinal frame.

7. The vehicle equipped with a battery pack according to claim 1, wherein the battery pack comprises:
a first battery auxiliary device arranged inside the floor tunnel in the front of the vehicle body;
a second battery auxiliary device arranged at the vehicle body rear of the first battery auxiliary device and arranged inside the floor tunnel at the rear of the vehicle body; and
a high-voltage electric wire that connects the first battery auxiliary device and the second battery auxiliary device, and extends in the front-rear direction of the vehicle body across the second floor cross member inside the floor tunnel; and
the first battery auxiliary device is formed higher upward as compared with the second battery auxiliary device.

8. The vehicle equipped with a battery pack according to claim 1, wherein
a pair of the second floor cross members is arranged on two sides of the floor tunnel in the vehicle width direction;
an inside of the floor tunnel comprises:
a first reinforcing material connected to the pair of the second floor cross members; and
a second reinforcing material connected to the floor panel, and
the first reinforcing material and the second reinforcing material are formed in an X-shape in a front view.

9. The vehicle equipped with a battery pack according to claim 1, wherein
each end portion of the second floor cross member and the third floor cross member are inclined downward toward the outer side in the vehicle width direction to the side sill;
the vehicle equipped with a battery pack comprises:
a first inclined member arranged below the floor panel in a manner of sandwiching the floor panel together with the end portion of the second floor cross member; and
a second inclined member arranged below the floor panel in a manner of sandwiching the floor panel together with the end portion of the third floor cross member,
the first inclined member forms a closed cross section extending to the side sill together with the floor panel, and
the second inclined member forms a closed cross section extending to the side sill together with the floor panel.

10. The vehicle equipped with a battery pack according to claim 9, wherein
the closed cross section formed by the first inclined member and the floor panel is larger than a closed cross section formed by the end portion of the second floor cross member and the floor panel, and
the closed cross section formed by the second inclined member and the floor panel is larger than a closed cross section formed by the end portion of the third floor cross member and the floor panel.

11. The vehicle equipped with a battery pack according to claim 1, wherein
a plurality of the floor longitudinal frames are arranged at intervals in the vehicle width direction; and
the floor panel has a bead portion that bulges upward in a bead shape at least between the floor longitudinal frames adjacent to each other in the vehicle width direction.

12. The vehicle equipped with a battery pack according to claim 1, wherein
a plurality of the floor longitudinal frames are arranged at intervals in the vehicle width direction; and
the floor panel has a bead portion that bulges upward in a bead shape at least between the floor longitudinal frames adjacent to each other in the vehicle width direction.

13. The vehicle equipped with a battery pack according to claim 2, wherein
a plurality of the floor longitudinal frames are arranged at intervals in the vehicle width direction; and
the floor panel has a bead portion that bulges upward in a bead shape at least between the floor longitudinal frames adjacent to each other in the vehicle width direction.

14. The vehicle equipped with a battery pack according to claim 4, wherein
a plurality of the floor longitudinal frames are arranged at intervals in the vehicle width direction; and
the floor panel has a bead portion that bulges upward in a bead shape at least between the floor longitudinal frames adjacent to each other in the vehicle width direction.

15. The vehicle equipped with a battery pack according to claim 1, wherein the battery case comprises:
a front portion fixed to the inner extension portion of the front side frame;
a rear portion fixed to the fourth floor cross member;
a right side portion and a left side portion fixed to the side sill; and a central portion in the front-rear direction of the vehicle body, fixed to the floor longitudinal frame.

16. The vehicle equipped with a battery pack according to claim 7, wherein
the first battery auxiliary device is a high-voltage junction board, and
the second battery auxiliary device is a cutoff switch.

17. The vehicle equipped with a battery pack according to claim 15, wherein
the battery case comprises a tray on which the battery module is arranged, and
the tray comprises:
a side frame that forms the left side portion and the right side portion fixed to the side sill, and
a tray deforming portion that is arranged between the side frame and the battery module and capable of absorbing an impact energy by deformation of a bottom portion due to a load of a side collision.

18. A vehicle equipped with a battery pack, comprising:
a second floor cross member that is raised upward from a floor panel forming a floor portion of the vehicle and extends in a vehicle width direction to support a rear portion of a front seat;
a third floor cross member that extends in the vehicle width direction along the second floor cross member at a vehicle body rear of the second floor cross member and is raised upward from the floor panel to support a front portion of a rear seat;
a floor longitudinal frame that extends in a front-rear direction of a vehicle body between the second floor cross member and the third floor cross member; and
a battery pack which is arranged under a floor of the floor longitudinal frame and the floor panel, and in which a battery case for accommodating a battery module is vertically fixed to the floor longitudinal frame,
a plurality of the floor longitudinal frames are arranged at intervals in the vehicle width direction; and
the floor panel has a bead portion that bulges upward in a bead shape at least between the floor longitudinal frames adjacent to each other in the vehicle width direction.

* * * * *